United States Patent [19]
Sugimoto et al.

[11] Patent Number: 5,579,304
[45] Date of Patent: Nov. 26, 1996

[54] CODE-DIVISION MULTIPLE-ACCESS RECEIVER WITH SEQUENTIAL INTERFERENCE-CANCELING ARCHITECTURE

[75] Inventors: Hiroki Sugimoto; Ikuo Kawasumi; Kenji Horiguchi, all of Tokyo, Japan

[73] Assignee: Oki Electric Industry Co., Ltd., Tokyo, Japan

[21] Appl. No.: 397,676

[22] Filed: Mar. 2, 1995

[30] Foreign Application Priority Data

Mar. 10, 1994 [JP] Japan .................................. 6-039421

[51] Int. Cl.⁶ .................... H04B 1/69; H04K 1/00
[52] U.S. Cl. ............... 370/18; 375/205; 375/208; 375/267; 375/347; 375/341; 375/349
[58] Field of Search ................ 370/18, 20; 375/208, 375/267, 346–349, 316, 341, 205

[56] References Cited

U.S. PATENT DOCUMENTS

| | | | |
|---|---|---|---|
| 5,105,435 | 4/1992 | Stilwell | 375/200 |
| 5,136,612 | 8/1992 | Bi | 370/18 |
| 5,151,919 | 9/1992 | Dent | 375/205 |
| 5,218,619 | 6/1993 | Dent | 375/205 |
| 5,341,395 | 8/1994 | Bi | 370/18 |
| 5,363,403 | 11/1994 | Schilling et al. | 380/34 |
| 5,394,434 | 2/1995 | Kawabe et al. | 375/205 |
| 5,463,660 | 10/1995 | Fukasawa et al. | 370/18 |
| 5,467,368 | 11/1995 | Takeuchi et al. | 370/18 |

OTHER PUBLICATIONS

Yoon et al, "A Spread–Spectrum Multi–Access System with a Cascade of Co–Channel Interference Cancellers for Multipath Fading Channels", IEEE ISSSTA '92, 1992, pp. 87–90.

*Primary Examiner*—Douglas W. Olms
*Assistant Examiner*—Seema S. Rao
*Attorney, Agent, or Firm*—Law Office Of Steven M. Rabin, P.C.

[57] ABSTRACT

A code-division multiple-access receiver carries out the following steps whenever it recognizes a symbol boundary in the received baseband signal. First, using the despreading code of the relevant station, it estimates the value of the symbol. Next, using the spreading code of the station, it estimates an interference signal, and modifies the baseband signal by subtracting the interference signal. These steps can be iterated for each symbol. The iterations can be organized into stages, with estimated symbol values from one stage passed to the next stage for use in estimating new symbol values in that next stage. At the end, the remaining baseband signal can be used to adjust the final estimated symbol values.

60 Claims, 17 Drawing Sheets ns,304

CODE-DIVISION MULTIPLE-ACCESS RECEIVER WITH SEQUENTIAL INTERFERENCE-CANCELING ARCHITECTURE

BACKGROUND OF THE INVENTION

The present invention relates to a code-division multiple-access receiver.

Code-division multiple-access (CDMA) communication enables multiple transmitting and receiving stations to share the same channel: for example, the same frequency band in the radio spectrum. In one type of CDMA system, each transmitting station has a different spreading code with which it spreads a baseband signal containing symbols to be transmitted. A receiver can recover the symbols transmitted by a particular station by using a corresponding despreading code. The despreading code singles out the signal of the desired station and reduces the signals of other stations to thermal noise.

Advantages of CDMA include security, resistance to multipath fading, and efficient utilization of bandwidth. The number of stations that can share the same channel is limited, however, by co-channel interference, which arises from a lack of synchronization between different transmitters, or a lack of orthogonality between different spreading codes or despreading codes. In a cellular telephone system, for example, such interference limits the number of mobile stations that can access the same base station at once. As the number of stations increases, the bit error rate also increases, until communication quality is degraded to all unacceptable degree.

Realization of the full potential of CDMA communications requires receivers that can cancel co-channel interference effectively, to achieve a low bit error rate even when many stations are active simultaneously. Among the proposed systems is one that operates on the signals from different stations in parallel and iteratively, canceling estimated interference at each iteration. The parallel architecture of this system, however, requires a large amount of memory, and simulation shows it to be less effective than expected. One reason is that in each iteration stage, no interference cancellation takes place until processing of all stations' signals is completed.

SUMMARY OF THE INVENTION

It is accordingly an object of the present invention to increase the number of stations that can simultaneously access a CDMA communication system.

Another object of the invention is, for a given number of stations, to reduce the error rate.

A further object is to reduce memory requirements.

The invented receiver converts a code-division multiple-access signal to a baseband signal, then carries out the following steps repeatedly, whenever it recognizes a symbol boundary.

First, it generates the spreading code and despreading code of the station to which the symbol belongs. Next, using the baseband signal and the despreading code, it estimates the value of the symbol. Then it uses the spreading code to estimate an interference signal, and modifies the baseband signal by subtracting the estimated interference signal. The interference thus canceled from the baseband signal corresponds to information in the estimated symbol value.

These steps are preferably repeated more than once for each symbol. The repetitions are organized into successive stages, each symbol being processed at least once in each stage. Estimated symbol values from one stage are passed to the next stage for use in estimating new symbol values in that next stage.

At the end, the final estimated symbol values of interest are output to a decoder. Prior to decoding, these final estimated symbol values can be adjusted by using the remaining baseband signal.

DETAILED DESCRIPTION OF THE INVENTION

Figure 1:
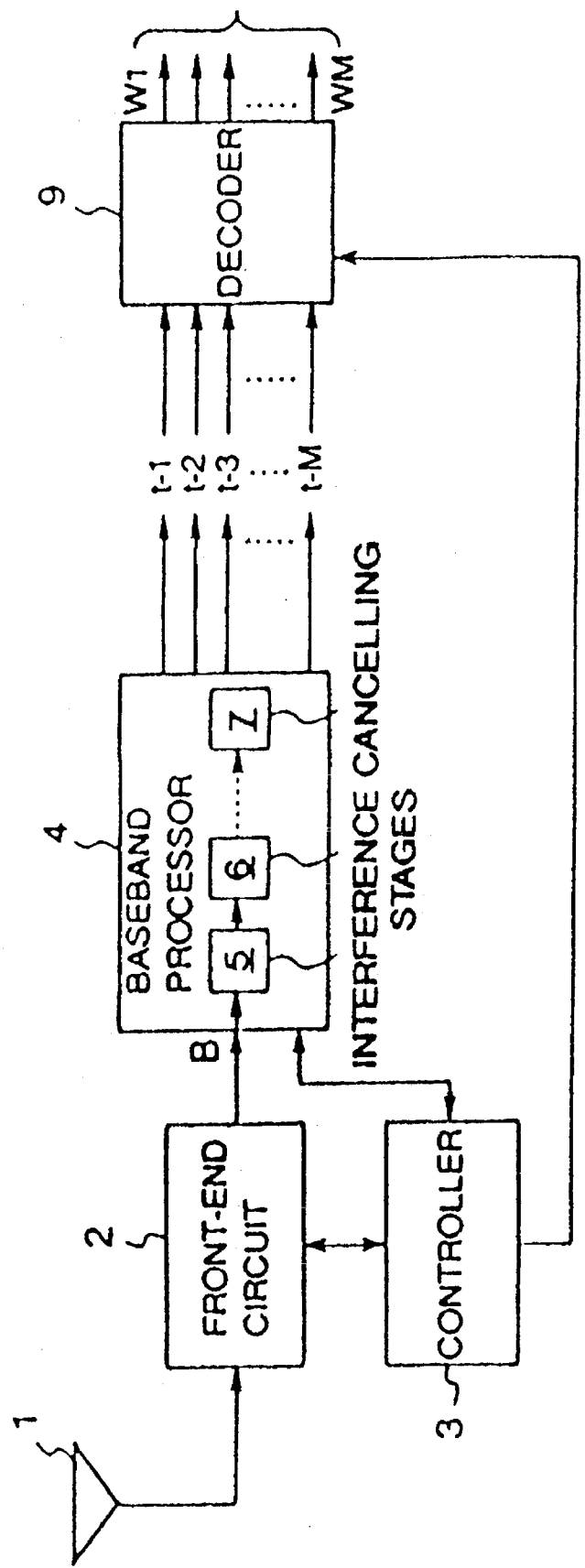
FIG. 1 is a block diagram of a first embodiment of the invented receiver.

Embodiments of the invention will now be described with reference to the attached illustrative drawings. First, however, it will be useful to describe how the signals to be received are produced.

When presented with data to be transmitted, a transmitter begins by encoding the data in a way that will enable transmission errors to be detected and corrected to a certain degree. Various encoding schemes can be employed: well-known examples include block encoding with addition of error-correcting bits, and convolutional coding. The encoded data are referred to as symbols. Here it will be assumed that each symbol has a value of plus or minus one.

Next, the transmitter uses a spreading code to spread the symbols. The spreading code consists of a fixed sequence of chips, the chip rate being higher than the symbol rate. Here it will be assumed that each chip also has the value plus or minus one, and the transmitter spreads the symbols by multiplying them by the chips. The result is a baseband signal, again with values of plus or minus one, having the same chip rate as the spreading code.

The transmitter uses this baseband signal to modulate a carrier signal. Various modulation schemes can be employed, including binary phase-shift keying (BPSK), differential binary phase-shift keying (DBPSK), quaternary phase-shift keying (QPSK), quadrature amplitude modulation (QAM), frequency modulation (FM), and the like. The carrier signal may be, for example, an electrical signal, an optical signal, or an acoustic signal. The modulated carrier may be radiated from an antenna, sent on an electrical power line, or emitted from an optical or acoustic element.

In a CDMA communication system there may be multiple transmitting stations, all employing the same type of carrier signal and the same carrier frequency, but each using a different spreading code. A receiving station thus receives a signal in which the signals of different stations, spread by different spreading codes, have been additively combined.

Alternatively, a single transmitting station may transmit simultaneously to multiple receiving stations, using a different spreading code for each receiving station. In this case, after being spread by the spreading codes, the baseband signals intended for different receiving stations are combined (added), and their sum is used to modulate the carrier signal. Each receiving station receives a signal in which signals intended for different stations, spread by different spreading codes, have been additively combined.

Many types of spreading codes are known, including pseudo-random noise codes, m-sequence codes, Gold codes, GMW-sequence codes, Bent-sequence codes, No-sequence codes, Walsh-sequence codes, majority-decision-sequence codes, Geffe-sequence codes, and so on. The following embodiments will refer to PN (pseudo-random noise) codes, but the invention can be practiced with any type of spreading code. Corresponding to each spreading code there is a despreading code, which may be identical to the spreading code.

In the first embodiment, illustrated in FIG. 1, M transmitting stations (not shown), all having different spreading codes, generate radio-frequency signals as described above and transmit them to an antenna 1. (M is an integer greater than one.) The antenna 1 thus receives a code-division multiple-access signal in which the signals from all the transmitting stations are combined. A front-end circuit 2 coupled to the antenna amplifies and demodulates the received signal to produce a baseband signal (B) which is substantially equal to the sum of the baseband signals belonging to all of the transmitting stations. The front-end circuit 2 is coupled to and controlled by a controller 3.

The baseband signal B is input to a novel baseband processor 4, which comprises a plurality of interference-canceling stages coupled in series. There may be any number of interference-canceling stages, including the minimal case of just one. The drawing illustrates a first interference-canceling stage 5, a second interference-canceling stage 6, and a last interference-canceling stage 7, with other stages possibly present between the second and last.

Each interference-canceling stage stores a one-symbol portion of the baseband signal B. The baseband signal B is input, one chip at a time, to the first interference-canceling stage 5, and passed toward the last interference-canceling stage 7, shifting to the right in the drawing as each new chip arrives.

Each interference-canceling stage generates estimated symbol values for the M stations, later stages refining the estimates of earlier stages. Each time a symbol value is thus estimated or re-estimated, corresponding information is removed from the baseband signal as interference. The final estimated symbol values t-1 to t-M are output to a decoder 9, which decodes them to reconstruct the data W1 to WM transmitted by the M stations. The baseband processor 4 and decoder 9 are also controlled by the controller 3.

Figure 2:
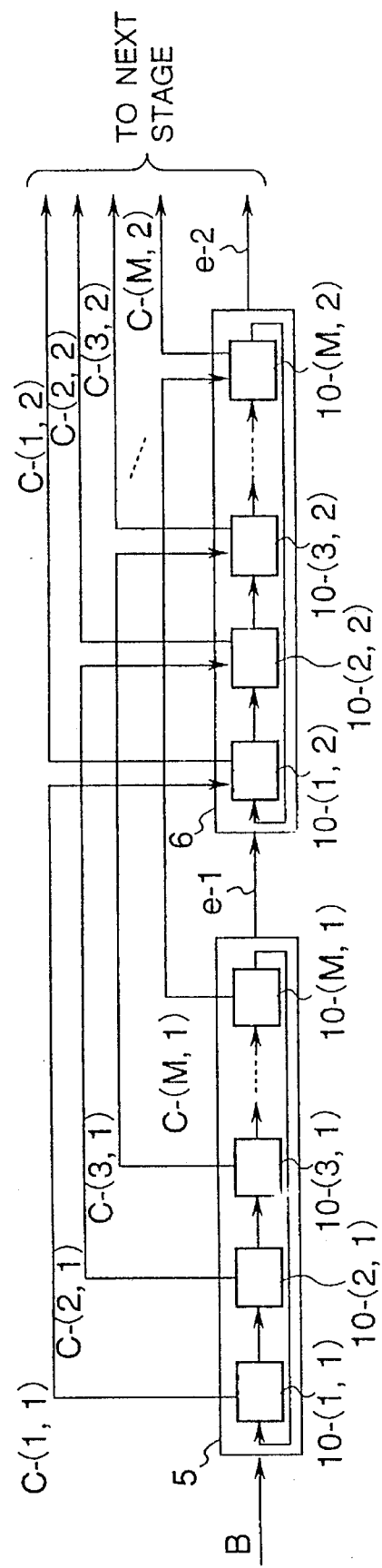
FIG. 2 is a more detailed drawing of the first part of the baseband processor in FIG. 1.

FIG. 2 shows the first two interference-canceling stages 5 and 6. The first interference-canceling stage 5 comprises M interference cancelers 10-(1, 1) to 10-(M, 1), which operate on the one-symbol portion of baseband signal B stored in the first interference-canceling stage 5 in a cyclic order as indicated by the arrows, and generate respective estimated symbol values C-(1, 1) to C-(M, 1). The baseband signal output from the first interference-canceling stage 5, denoted e-1, represents the information remaining (the estimation error) after each station's symbols have been estimated once.

The second interference-canceling stage 6 comprises M interference cancelers 10-(1, 2) to 10-(M, 2), which operate cyclically on the one-symbol portion of remaining baseband signal e-1 stored in the second interference-canceling stage 6. Each interference canceler 10-(i, 2) in the second stage 6 receives the estimated symbol value C-(i, 1) generated by the corresponding interference canceler 10-(i, 1) in the first stage 5, and generates a new estimated symbol value C-(i, 2). The baseband signal output from the second interference-canceling stage 6, denoted e-2, represents the remaining information after each station's symbols have been estimated twice.

Figure 3:
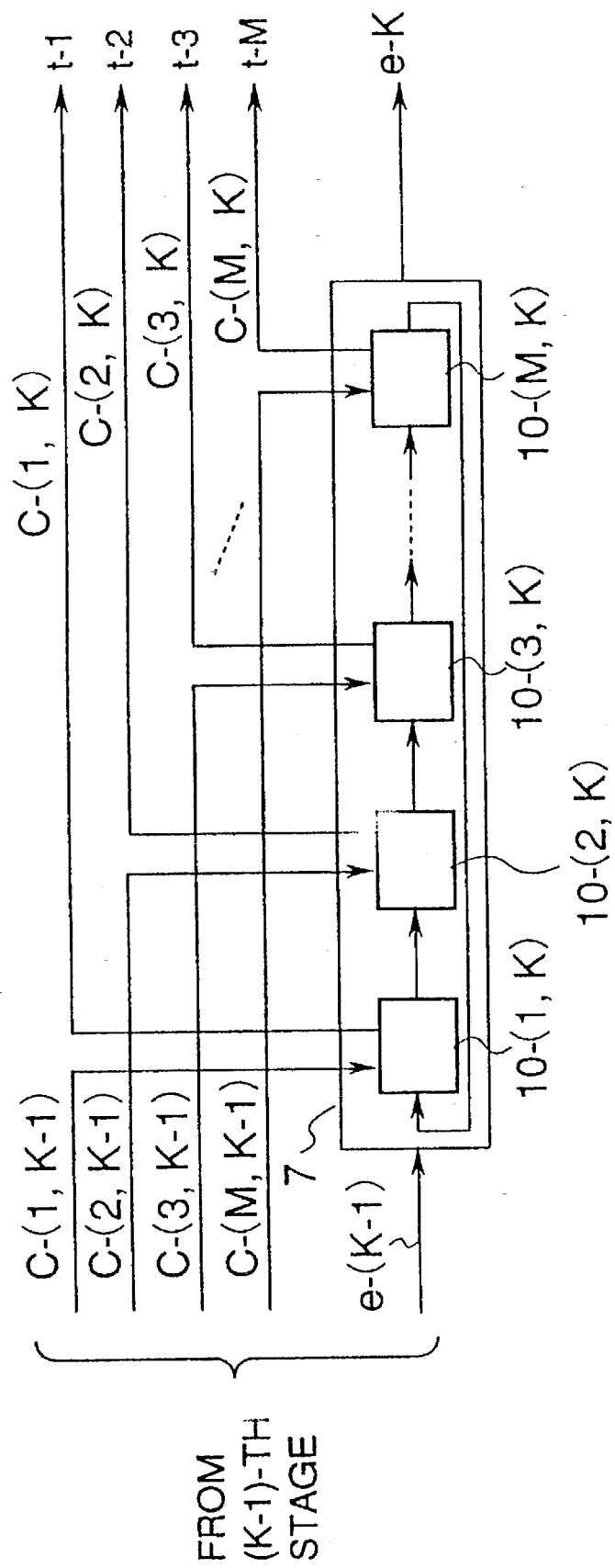
FIG. 3 is a more detailed drawing of the last part off the baseband processor in FIG. 1.

The baseband signal e-2 and the estimated symbol values C-(i, 2) from the second interference-canceling stage 6 are supplied to the next (third) stage, and the same process continues. Referring to FIG. 3, the last (K-th) interference-canceling stage 7 receives estimated symbol values C-(i, K-1) from the preceding (K-1)-th stage, uses them to estimate each symbol value for a K-th time, and outputs estimated symbol values C-(i, K) as the values t-1 to t-M that were shown in FIG. 1. This last stage 7 comprises M interference cancelers 10-(1, K) to 10-(M, K), which operate cyclically on the one-symbol portion off the baseband signal e-(K-1) output from the (K-1)-th stage. The baseband signal e-K output from the last interference-canceling stage 7 represents the remaining information after each station's symbols have been estimated K times.

Figure 4:
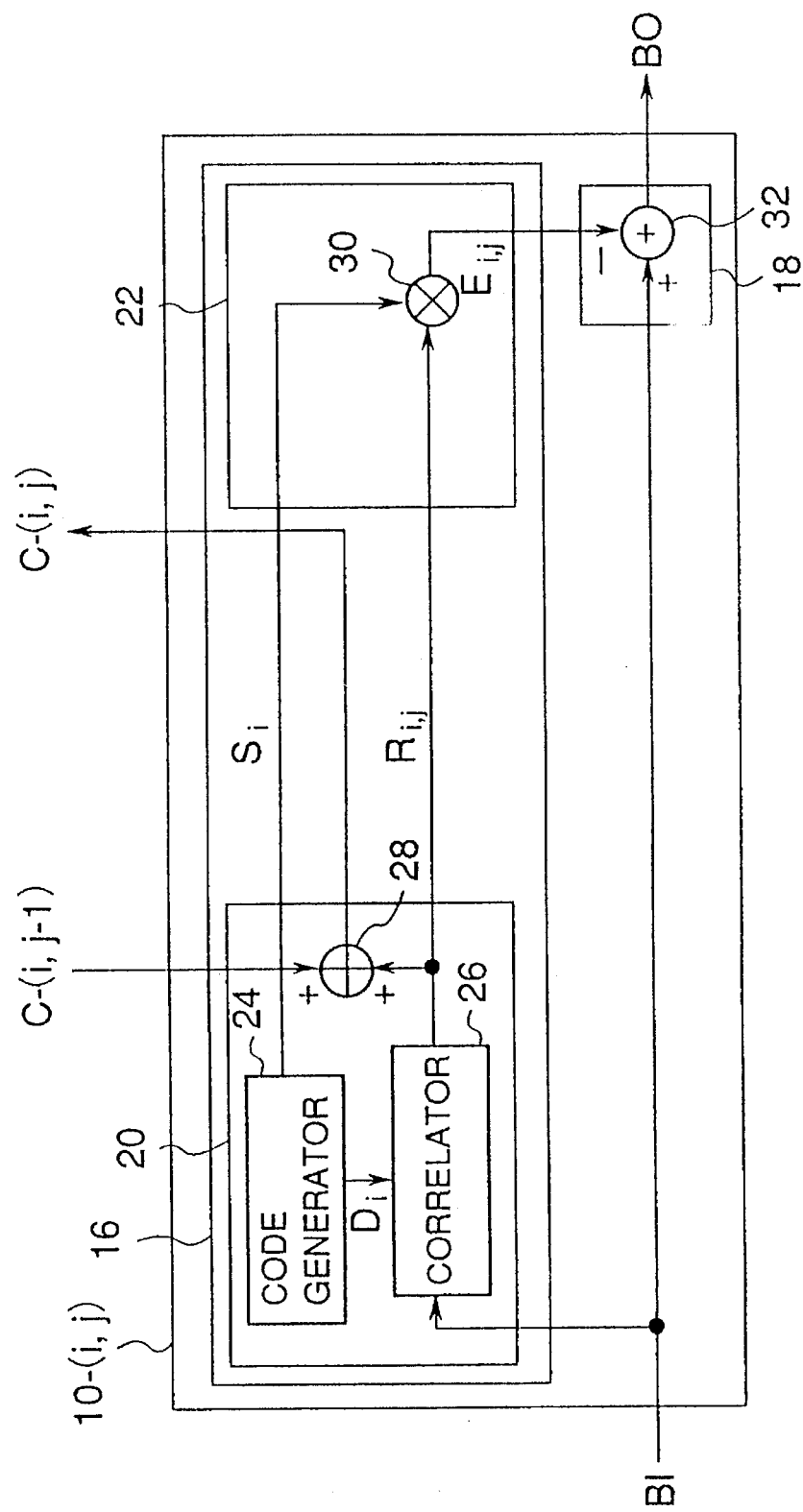
FIG. 4 is a more detailed drawing of one interference canceler in FIG. 1.

FIG. 4 shows the internal structure of an interference canceler 10-(i, j). The one-symbol baseband signal portion input to this interference canceler 10-(i, j) is denoted BI. The modified baseband signal after cancellation of interference by this interference canceler is denoted BO. An old estimated symbol value C-(i, j-1) is input from the (j-1)-th interference-canceling stage, and a new estimated symbol value C-(i, j) is output to the (j+1)-th interference-canceling stage. These estimated symbol values pertain to the i-th transmitting station.

Interference canceler 10-(i, j) can be divided into two parts: an estimator 16, and a canceler 18. The estimator 16 can be further divided into a symbol estimator 20 and an interference estimator 22. The symbol estimator 20 comprises a code generator 24, a correlator 26, and an adder 28. The interference estimator 22 comprises a multiplier 30. The canceler 18 comprises a subtractor 32.

The code generator 24 generates the spreading code $S_i$ and despreading code $D_i$ of the i-th transmitting station. The correlator 26 correlates the despreading code D with the input baseband signal BI to obtain a residual symbol value $R_{i,j}$. The adder 28 adds the residual symbol value $R_{i,j}$ to the old estimated symbol value C-(i, j−1) to generate the new estimated symbol value C-(i, j). The multiplier 30 multiplies the residual symbol value $R_{i,j}$ by the spreading code $S_i$ to generate an estimated interference signal $E_{i,j}$. The subtractor 32 subtracts the estimated interference signal $E_{i,j}$ from the input baseband signal BI to generate the output baseband signal BO.

Figure 5:
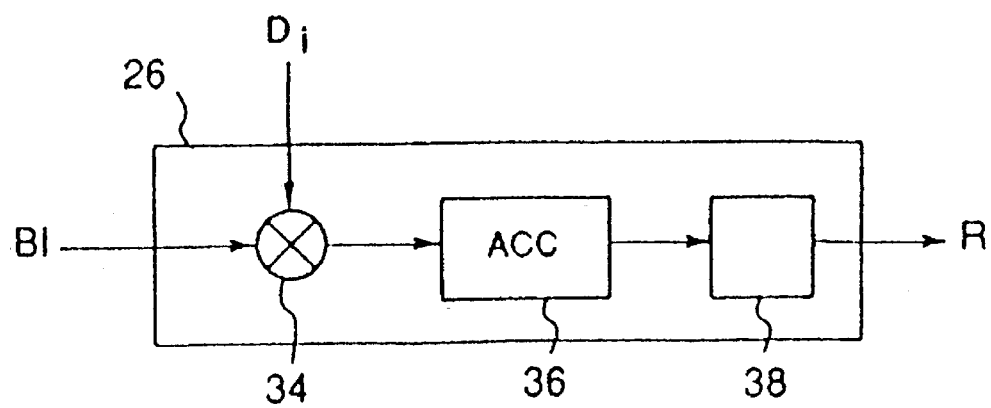
FIG. 5 is a more detailed drawing of the correlator in FIG. 4.

As shown in FIG. 5, the correlator 26 comprises a multiplier 34, an accumulator 36, and a normalizer 38. The multiplier 34 multiplies the input baseband signal BI by the despreading code $D_i$, the accumulator 36 accumulates the resulting products, and the normalizer 38 normalizes their sum.

All of the interference cancelers 10-(i, j) have the structure shown in FIGS. 4 and 5, except that in the first interference-canceling stage 5, there are no estimated symbol values to be input from a preceding stage. Accordingly, the interference cancelers 10-(i, 1) in the first interference-canceling stage 5 can omit the adder 28 in FIG. 4, and output the residual symbol value $R_{i,1}$ directly as the estimated symbol value C-(i, 1). Alternatively, the adder 28 can be retained and a value of zero input as an estimated symbol value C-(i, 0) from a (non-existent) preceding stage.

Figure 6:
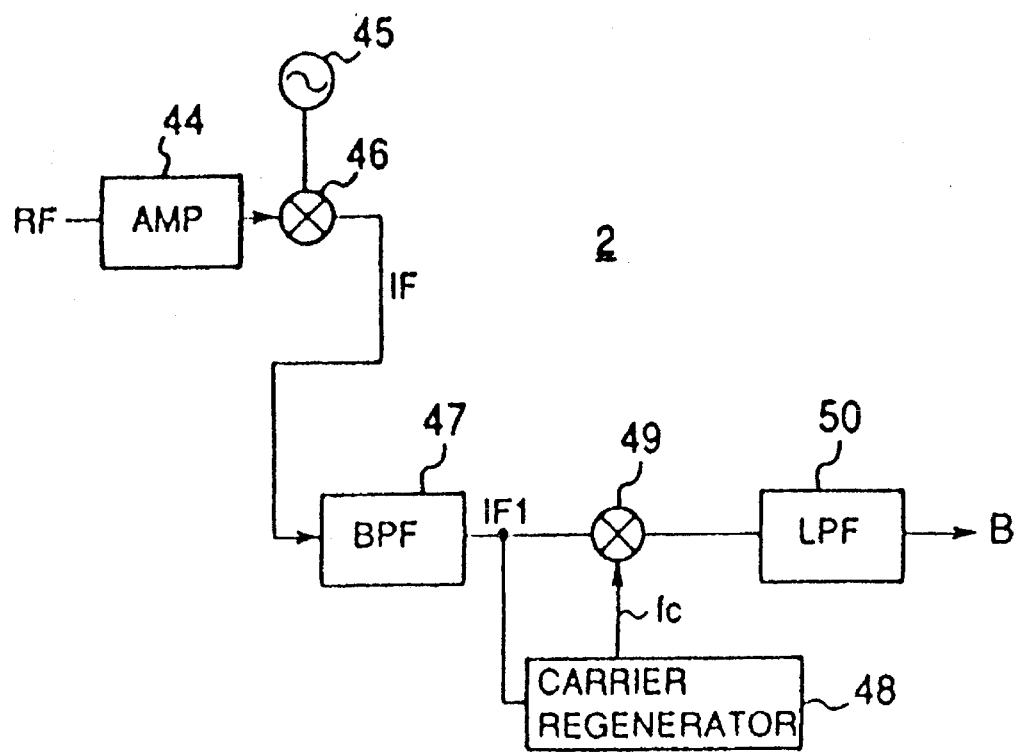
FIG. 6 is a more detailed drawing of the front-end circuit in FIG. 1.

FIG. 6 shows the internal structure of the front-end circuit 2. In this embodiment, the transmit signals are modulated by BPSK. The front-end circuit 2 comprises an amplifier 44 that amplifies the radio-frequency signal RF received from the antenna 1, a local oscillator 45 that generates a local radio-frequency carrier signal, and a synchronous detector 46 that multiplies the amplifier output by this carrier signal to obtain an intermediate-frequency signal IF, which is filtered by a bandpass filter (BPF) 47 to remove undesired frequency components. A carrier regenerator 48 recovers an intermediate-frequency carrier signal fc from the filtered signal IF1. The filtered signal IF1 and carrier fc are multiplied together in a mixer 49, thereby effecting a phase comparison, and the resulting product signal is reshaped by a low-pass filter (LPF) 50 to produce the baseband signal B.

Figure 7:
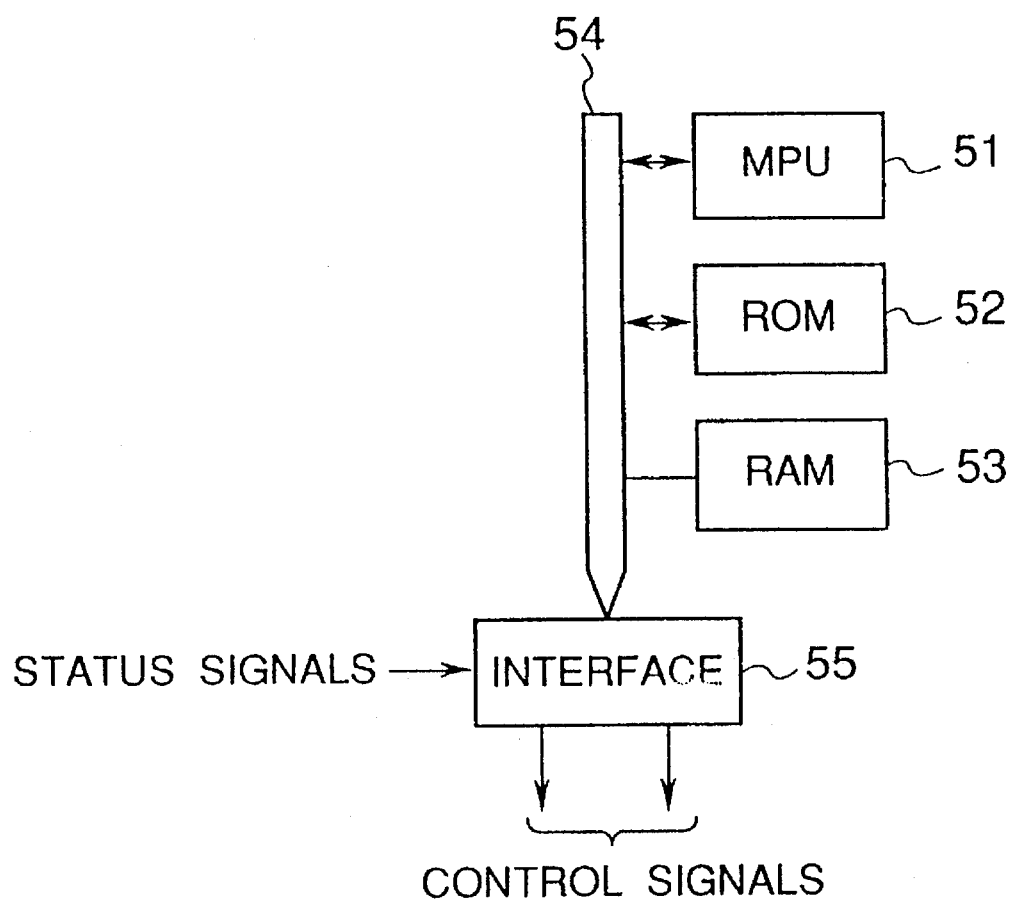
FIG. 7 is a more detailed drawing of the controller in FIG. 1.

FIG. 7 shows the internal structure of the controller 3, which comprises a microprocessor unit (MPU) 51, read-only memory (ROM) 52, and random-access memory (RAM) 53 coupled to a common internal bus 54. The internal bus 54 is coupled to an interface circuit 55 that receives status signals from, and outputs control signals to, the other components of the receiver.

The MPU 51 executes a program stored in the ROM 52, using the RAM 53 as work memory. Among the tasks performed by the controller 3 are the assignment of different spreading codes to different transmitting stations, the assignment of corresponding spreading and despreading codes to the code generators 24 in the interference cancelers, and synchronization of these code generators 24 with spreading code generators in the transmitting stations. Methods of synchronizing code generators in a transmitter and a receiver are well known, so a description will be omitted.

The controller 3 is also able to identify symbol boundaries in the received baseband signal B. That is, it can identify portions of the baseband signal B corresponding to one symbol transmitted by each of the transmitting stations. The transmitting stations are not mutually synchronized, so one-symbol portions from different transmitting stations tend to be partially overlapping. The controller 3 controls the correlator 26 in each interference canceler 10-(i, j) so that the accumulator 36 is cleared to zero at each symbol boundary of the i-th transmitting station.

Figure 8:
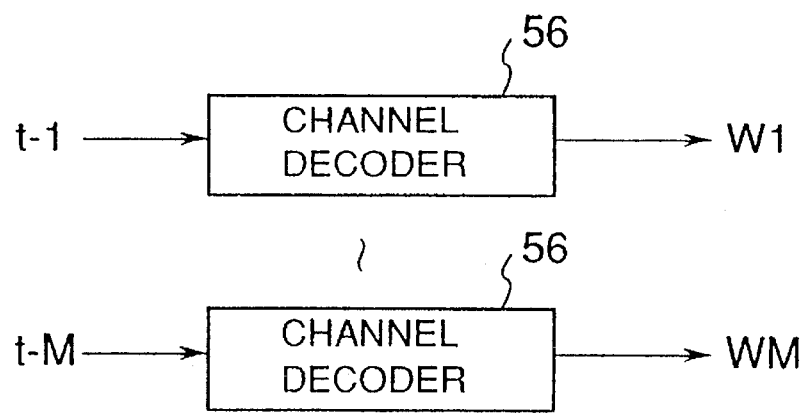
FIG. 8 is a more detailed drawing of the decoder in FIG. 1.

FIG. 8 shows the structure of the decoder 9. As illustrated, the decoder 9 comprises M identical channel decoders 56. The i-th channel decoder 56 receives the estimated symbol values t-i output from the baseband processor 4 for the i-th transmitting station, and decodes them to obtain the data Wi transmitted by that transmitting station. The value of i ranges from 1 to M.

Figure 9:
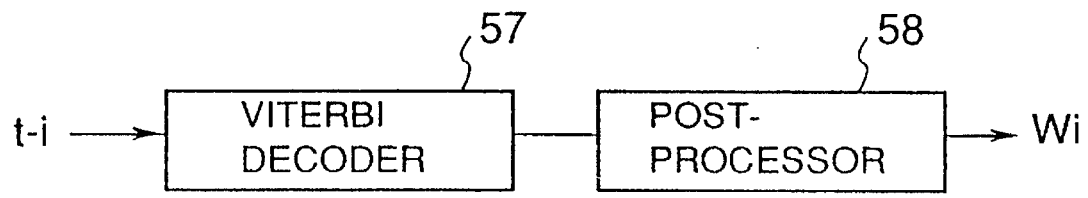
FIG. 9 is a more detailed drawing of one channel decoder in FIG. 8.

FIG. 9 illustrates the structure of a channel decoder 56. This embodiment employs convolutional coding, so the channel decoder 56 has a Viterbi decoder 57 that performs a maximum-likelihood analysis on the estimated symbol values t-i. A post-processor 58 performs further operations, such as error-correcting operations, on the output of the Viterbi decoder 57.

Further details of the circuits shown in FIGS. 6 to 9 will be omitted, as these circuits are well known to those skilled in the art. Hardware details of the interference cancelers will also be omitted, as these can be implemented with well-known digital circuits such as adders and multipliers.

Next the operation of this first embodiment will be described.

The spreading code assigned to the i-th transmitting station will be denoted $PN_i$. In this embodiment the despreading codes are identical to the spreading codes, so the despreading code of the i-th transmitting station is also $PN_i$. The spreading gain will be denoted G; that is, each symbol is spread into G chips. Using $PN_i(n)$ to represent the individual chip values of the spreading code, the i-th transmitting station transmits a symbol $Y_i$ as a series of chip values $Z_i(n)$, where n ranges from 1 to G, and $$Z_i(n) = Y_i \cdot PN_i(n)$$

The baseband signal B input to the baseband processor 4 can be expressed as the sum of these transmitted signals. If B(n) denotes the value of B at time n, then:

$$B(n) = \sum_{i=1}^{M} Z_i(n)$$

When the controller 3 detects a symbol boundary of the i-th transmitting station in the baseband signal B, it clears the accumulator 36 in the correlator 26 of interference canceler 10-(i, 1). following this clear, interference canceler 10-(i, 1) reads the G chips B(n) (n=1 to G) of baseband signal B stored in the first interference-canceling stage 5. Due to the cyclic order in which the interference cancelers operate, some of these chips will already have been modified by interference cancelers 10-(j, 1), where j=1, 2, ..., i−1, i+1, ..., M. The multiplier 34 multiplies each chip B(n) by the corresponding despreading-code value $PN_1(n)$, and the accumulator 36 accumulates the sum of the resulting products. The normalizer 38 divides the sum in the accumulator 36 by the spreading gain G. The resulting residual symbol value $R_{i,1}$ is:

$$R_{i,1} = (1/G) \cdot \sum_{n=1}^{G} PN_i(n) \cdot \sum_{j=1}^{M} Z_j(n)$$

Expanding $Z_j(n)$ into $Y_j \cdot PN_j(n)$ and treating the cases of $j=i$ and $j \neq i$ separately, $$R_{i,1} = Y_i + (1/G) \cdot \sum_{n=1}^{G} PN_i(n) \cdot \sum_{j \neq i} Y_j PN_j(n)$$

As explained above, residual symbol value $R_{i,1}$ is output as the estimated symbol value C-(i, 1). The double summation term in equation (3) represents the estimation error due to interference from other transmitting stations. If the transmitting stations were synchronized and the spreading codes were all mutually orthogonal, the estimation error would be zero. Since the transmitting stations are not synchronized and their spreading codes are not necessarily orthogonal, the estimation error is not likely to be zero, but neither is it likely to be very large, because when $i \neq j$, products of the form $PN_i(n) \cdot Y_j \cdot PN_j(n)$ take on values of plus and minus one essentially at random.

Since the residual symbol value $R_{i,1}$ has been output as an estimated symbol value C-(i, 1), its contribution to the baseband signal B is no longer needed, and would be a source of interference in estimating the symbol values of other stations. Accordingly, the multiplier 30 now respreads the residual symbol value $R_{i,1}$ by multiplying it by the first station's spreading code $PN_i(n)$ to estimate this interference, obtaining:

$$E_{i,1}(n) = PN_i(n) \cdot R_{i,1}$$

The subtractor 32 modifies the baseband signal B by subtracting this estimated interference signal $E_{i,1}$, performing the following operation:

$$B(n) \leftarrow B(n) - E_{i,1}(n)$$

As a result, the baseband signal no longer contains the information that has been encapsulated in the estimated symbol value C-(i, 1).

As a chip B(n) of the baseband signal moves through the first interference-canceling stage 5, the controller 3 detects symbol boundaries of all M transmitting stations and activates all M interference cancelers 10-(i, 1) in turn. The value of B(n) is accordingly modified M times. Upon leaving the first interference-canceling stage 5 and becoming part of the remaining baseband signal denoted e-1 in FIG. 2, this chip has the following value $e_1(n)$:

$$e_1(n) = B(n) - \sum_{i=1}^{M} E_{i,1}$$

The interference cancelers 10-(i, 2) in the second interference-canceling stage 6 now operate on the remaining baseband signal e-1. As in the first stage, interference canceler 10-(i, 2) is activated when the controller 3 detects a symbol boundary of the i-th transmitting station. This interference canceler 10-(i, 2) correlates the i-th transmitting station's despreading code $PN_i$ with signal e-1 to obtain a residual symbol value $R_{i,2}$ as follows:

$$R_{i,2} = (1/G) \cdot \sum_{n=1}^{G} e_1(n) \cdot PN_i(n)$$

This residual symbol value $R_{i,2}$ is an estimate of the error that was made in estimating the i-th transmitting station's symbol value in the first interference-canceling stage 5. By adding this $R_{i,2}$ to the estimated symbol value C-(i, 1) from the first stage 5, the adder 28 obtains a new estimated symbol value C-(i, 2) that is closer to the true symbol value $Y_i$.

$$C\text{-}(i, 2) = R_{i,2} + C\text{-}(i, 1)$$

Using the i-th station's spreading code $PN_i$, the multiplier 30 spreads the residual symbol value $R_{i,2}$ to obtain an estimated interference signal $E_{i,2}$, which is subtracted from the remaining baseband signal. Information represented by the estimated symbol value C-(i, 2) has now been entirely canceled from the baseband signal B: the part $E_{i,1}$ corresponding to C-(1, 1) was canceled in the first interference-canceling stage 5, and the part $E_{i,2}$ corresponding to $R_{i,2}$ is canceled in the second stage 6.

Upon leaving the second interference-canceling stage 6, the remaining baseband signal e-2 is free of all information contained in the estimated symbol values C-(i, 2), where i=1 to M. Its chip values $e_2(n)$ have the form:

$$e_2(n) = B(n) - \sum_{i=1}^{M} E_{i,1} - \sum_{i=1}^{M} E_{i,2}$$

Operation in the succeeding stages continues in the same manner. The interference cancelers 10-(i, k) in the k-th stage operate on the remaining baseband signal e-(k-1) output from the (k-1)-th interference-canceling stage, which has chip values $e_{k-1}(n)$. The residual symbol value $R_{i,k}$ has the form:

$$R_{i,k} = (1/G) \cdot \sum_{n=1}^{G} e_{k-1}(n) \cdot PN_i(n)$$

The value of $e_{k-1}(n)$ in this equation may already have been modified by other interference cancelers 10-(j, k) in the k-th interference-canceling stage. The estimated symbol value C-(i, k) output by interference canceler 10-(i, k) is:

$$C\text{-}(i, k) = R_{i,k} + C\text{-}(i, k-1)$$

The estimated interference signal $E_{i,k}(n)$ has the value:

$$E_{i,k}(n) = R_{i,k} \cdot PN_i(n)$$

The remaining baseband signal e-k output from the k-th interference-canceling stage no longer contains information that could be obtained from any of the estimated symbol values output so far. Its chip values $e_k(n)$ have the form:

$$e_k(n) = B(n) - \sum_{j=1}^{k} \sum_{i=1}^{M} E_{i,j}$$

At each succeeding stage, the estimated symbol values C-(i, k) tend to come closer to the true symbol values $Y_i$. By the end of the K-th and last interference-canceling stage 7, interference has been canceled K·M times. If K is sufficiently large, the symbol values t-1 to t-M output to the decoder 9 will be relatively free of interference, making accurate decoding possible, and the data values W1 to WM output by the decoder 9 will have an acceptably low error rate.

Figure 10:
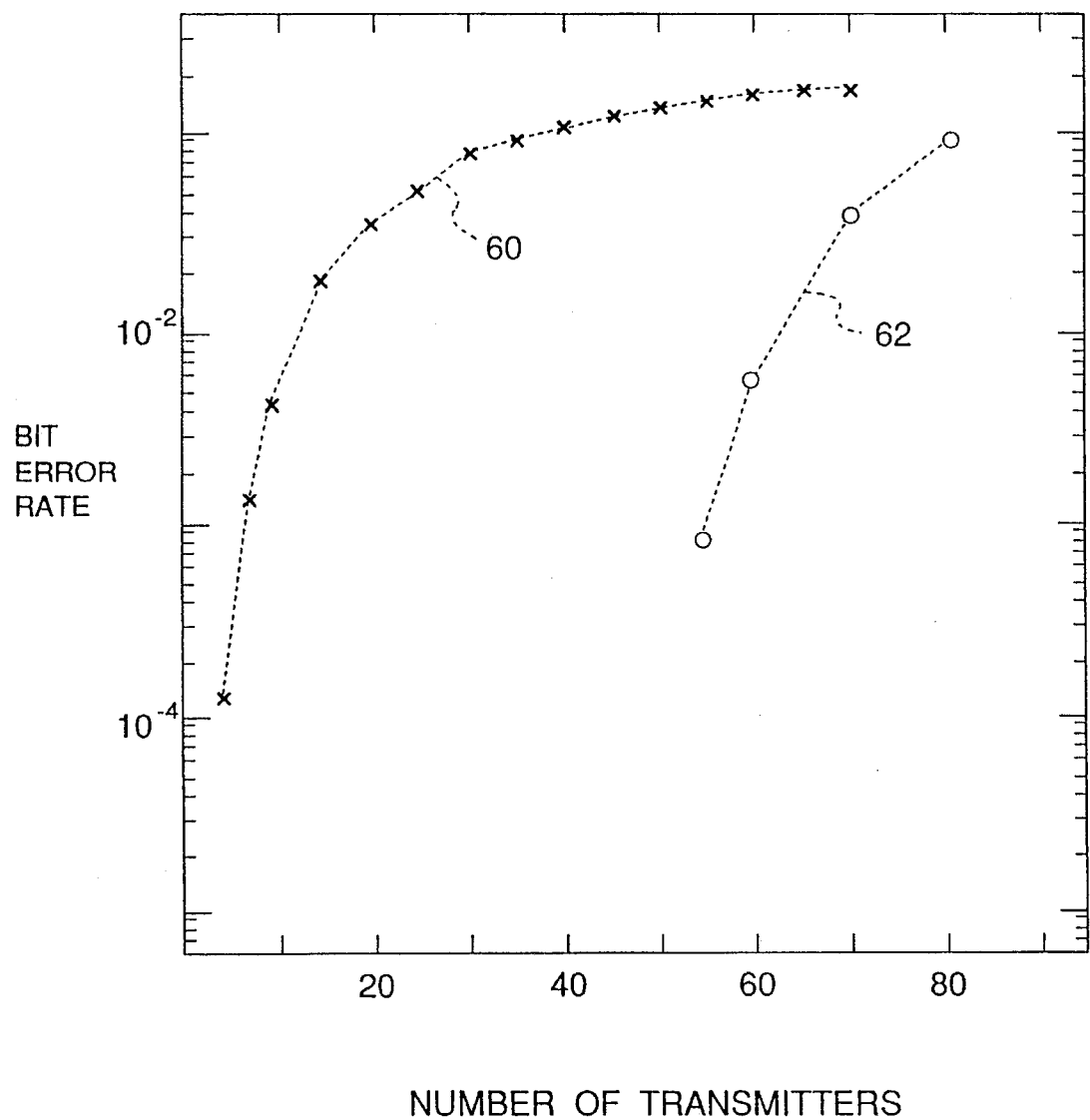
FIG. 10 compares bit-error-rate characteristics of the first embodiment and the prior art.

FIG. 10 shows bit error rates obtained by simulation of the operation of the first embodiment and of a prior-art receiver. Bit error rate is shown on the vertical axis, and the number of transmitting stations (M) on the horizontal axis. Curve 60, with data points marked by X's, represents the prior art. Curve 62, with data points marked by circles, represents the first embodiment of the invention. If an acceptable bit error rate is, for example, $10^{-3}$ then the prior art has difficulty in handling more than about ten transmitting stations, while the invented receiver easily handles more than fifty. For any number of stations, the invented receiver has a far lower bit error rate than the prior art.

The spreading and despreading codes employed in this simulation were PN codes with a repeating period of $2^{42} - 1$ and a spreading gain (G) of sixty-four. The transmitted data were pseudo-random data with a repeating period of five hundred eleven. The number of stages K was ten for the invented receiver, and one for the prior art. Moreover, in the prior-art simulation no interference cancellation was performed; symbol values were estimated by correlating each despreading code $PN_i$ with the baseband signal B as output by the front-end circuit 2.

The low bit error rate of the invented receiver can be attributed to the fact that every time a symbol value is estimated, it is estimated from a baseband signal that has been optimized by canceling all co-channel interference that has been identified so far.

Next a second embodiment of the invention will be described.

Figure 11:
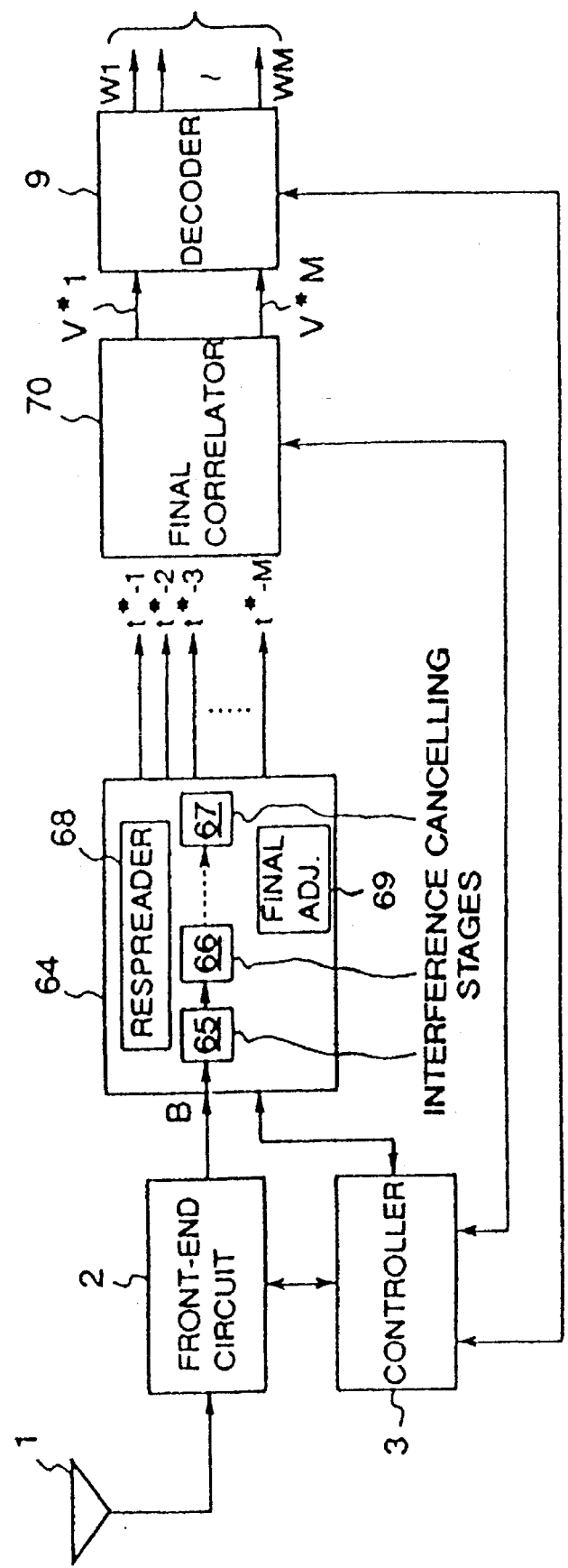
FIG. 11 is a block diagram of a second embodiment of the invented receiver.

Referring to FIG. 11, the second embodiment has the same antenna 1, front-end circuit 2, controller 3, and decoder 9 as the first embodiment. The baseband processor 64 of the second embodiment comprises a series of interference-canceling stages 65, 66, ... , 67 which are interconnected as in the first embodiment, but differ somewhat in the structure of their interference cancelers. The baseband processor 64 also comprises a respreader 68 and a final adjustment processor 69.

The baseband processor 64 outputs a set of baseband signals t*-1 to t*-M, which are estimates of the baseband signals transmitted by the M transmitting stations, rather than of the symbols transmitted by these stations. These estimated baseband signals t*-1 to t*-M are processed by a final correlator 70 to produce final estimated symbol values V*1 to V*M for input to the decoder 9.

Figure 12:
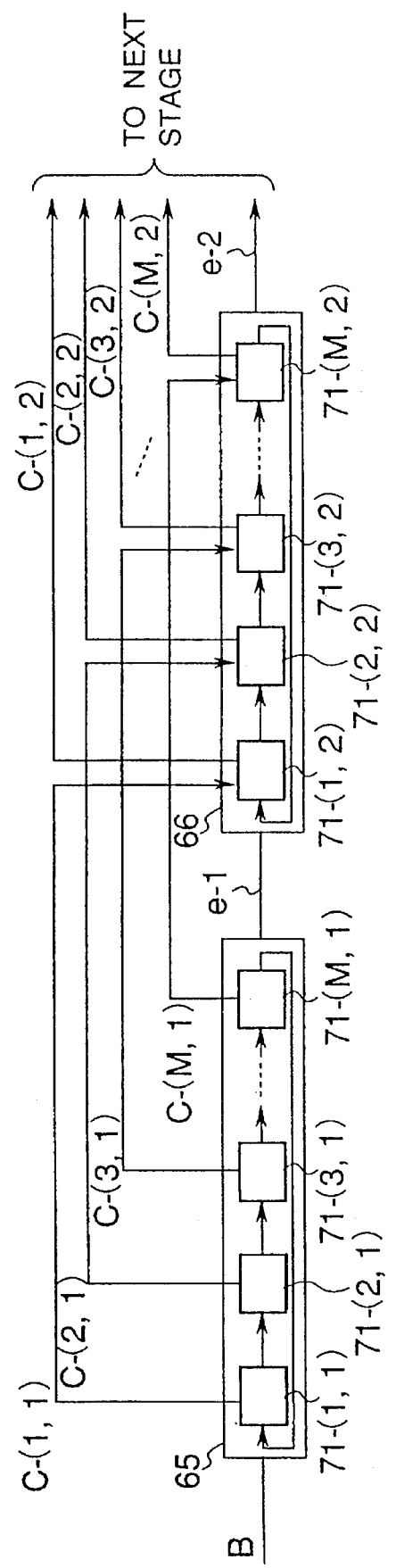
FIG. 12 is a more detailed drawing of the first part of the baseband processor in FIG. 11.

FIG. 12 shows the first interference-canceling stage 65, comprising interference cancelers 71-(1, 1) to 71-(M, 1), and the second interference-canceling stage 66, comprising interference cancelers 71-(1, 2) to 71-(M, 2). The interconnections between these interference cancelers and their input and output signals B, e-1, e-2, and C-(i, j) are entirely analogous to FIG. 2, so a detailed description will be omitted.

Figure 13:
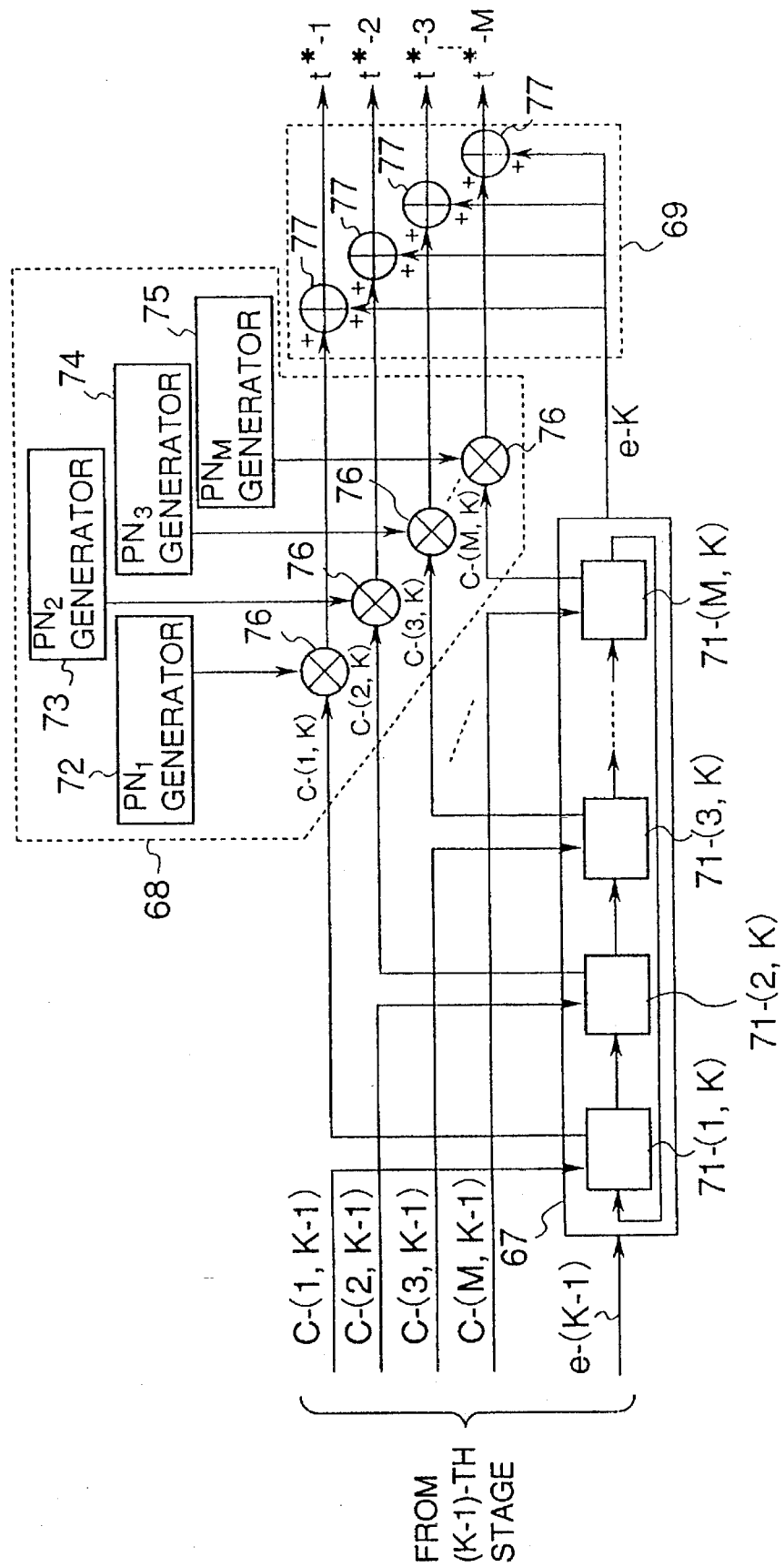
FIG. 13 is a more detailed drawing off the last part of the baseband processor in FIG. 11.

FIG. 13 shows the last interference-canceling stage 67 (the K-th stage), the respreader 68, and the final adjustment processor 69. The respreader 68 comprises a spreading code generator ($PN_i$ generator) for each of the transmitting stations. The generated spreading codes are supplied to multipliers 76 and used to respread the corresponding estimated symbol values C-(i, K) output from the last interference-canceling stage 71. Thus the spreading code $PN_1$ generated by the first spreading code generator 72 respreads C-(1, K), the spreading code $PN_2$ generated by the second spreading code generator 73 respreads C-(2, K), the spreading code $PN_3$ generated by the third spreading code generator 74 respreads C-(3, K), and the spreading code $PN_M$ generated by the M-th spreading code generator 75 respreads C-(M, K).

The respread signals output from the multipliers 76 are supplied to corresponding adders 77 in the final adjustment processor 69, which add them to the remaining baseband signal e-K output from the last interference-canceling stage 67. The resulting sum signals t*-1 to t*-M become the outputs of the baseband processor 64.

Figure 14:
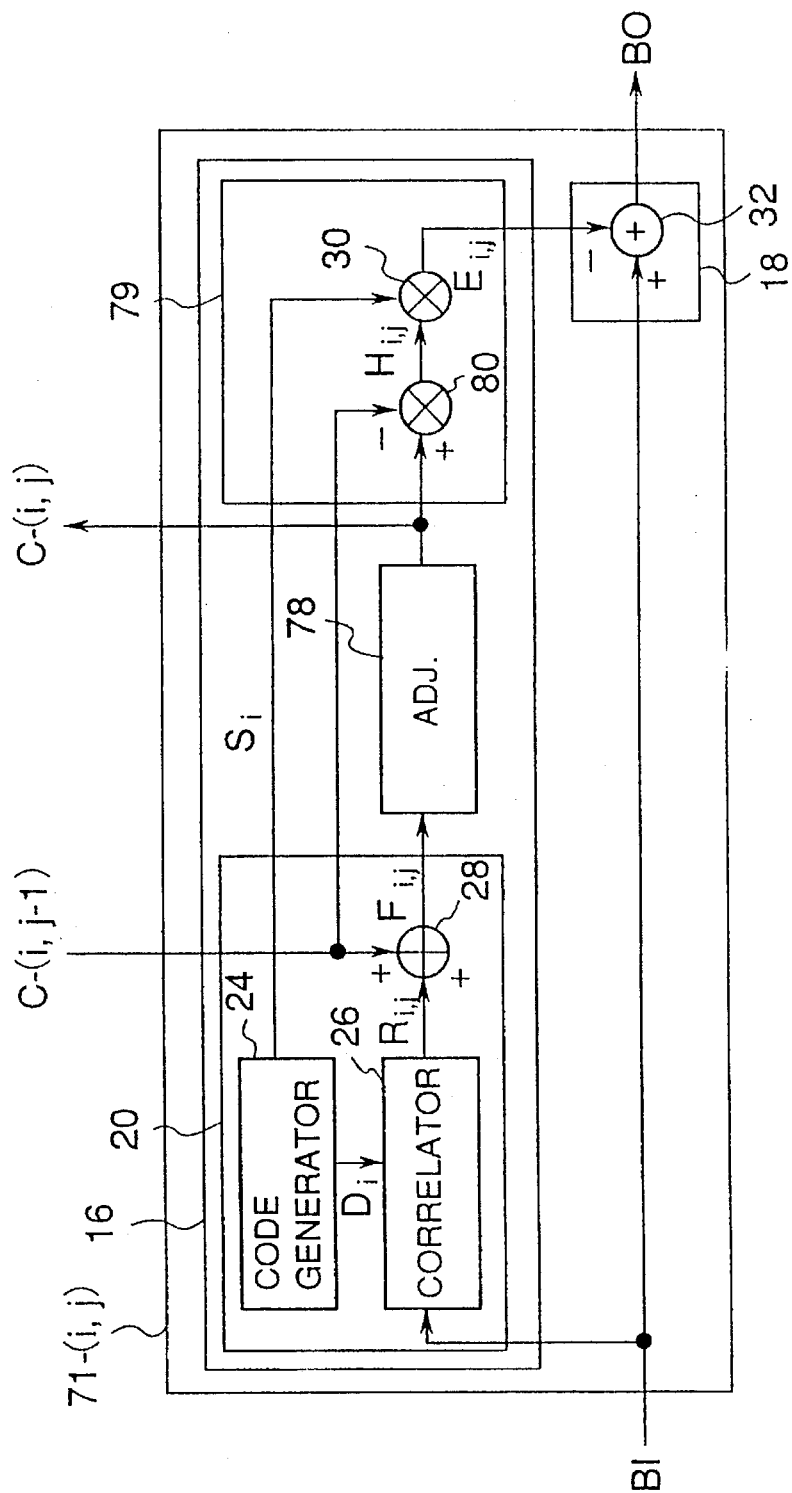
FIG. 14 is a more detailed drawing of one interference canceler in FIG. 11.

FIG. 14 shows the structure of an interference canceler 71-(i, j) in the second embodiment. As in the first embodiment, the interference canceler can be divided into an estimator 16 and a canceler 18. The estimator 16 receives an input baseband signal BI and an old estimated symbol value C-(i, j-1) and outputs a new estimated symbol value C-(i, j) and an estimated interference signal $E_{i,j}$. The canceler 18 subtracts $E_{i,j}$ from the input baseband signal BI to produce an output baseband signal BO. The canceler 18 comprises a subtractor 32 as in the first embodiment.

The symbol estimator 20 is identical to the symbol estimator in the first embodiment, comprising a code generator 24 that generates spreading and despreading codes $S_i$ and $D_i$, a correlator 26 that produces a first residual symbol value $R_{i,j}$, and an adder 28 that adds $R_{i,j}$ to the estimated symbol value C-(i, j-1) from the preceding stage. The resulting sum is not output directly as the new estimated symbol value, however. Instead, it is sent as a preliminary symbol value $F_{i,j}$ to an adjustment processor 78, which performs various adjustments (described later) to produce the new estimated symbol value C-(i, j).

The estimated symbol value C-(i, j) and the old estimated symbol value C-(i, j-1) from the preceding stage are input to a subtractor 80 in the interference estimator 79, which subtracts the latter from the former to produce a second residual symbol value $H_{i,j}$. A multiplier 30 then spreads this second residual symbol value $H_{i,j}$ by the spreading code $S_i$ to produce the estimated interference signal $E_{i,j}$.

In the interference cancelers 71-(i, 1) of the first interference-canceling stage 65, since no old estimated symbol values are input from a preceding stage, the adder 28 and subtractor 80 can be omitted.

Figure 15:
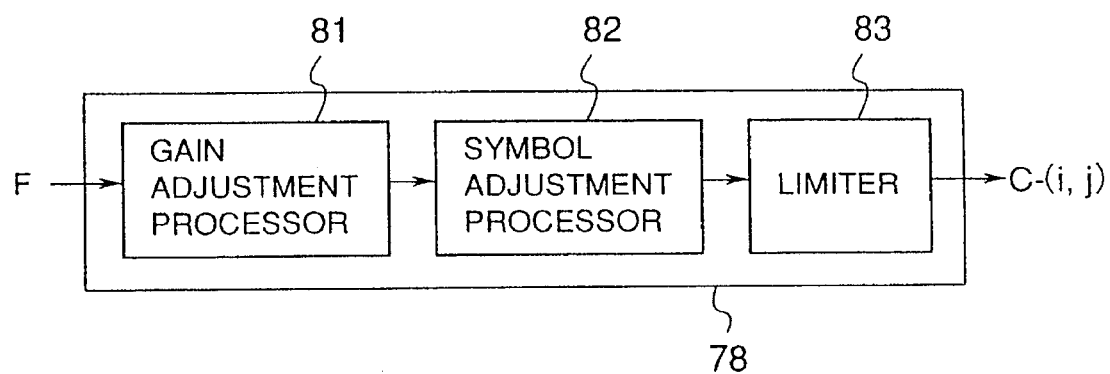
FIG. 15 is a more detailed drawing of the adjustment processor in FIG. 14.

FIG. 15 shows the internal structure of the adjustment processor 78, which comprises a gain adjustment processor 81, a symbol adjustment processor 82, and a limiter 83 coupled in series. The gain adjustment processor 81 receives the preliminary symbol value $F_{i,j}$, and the limiter 83 outputs the estimated symbol value C-(i, j).

Figure 16:
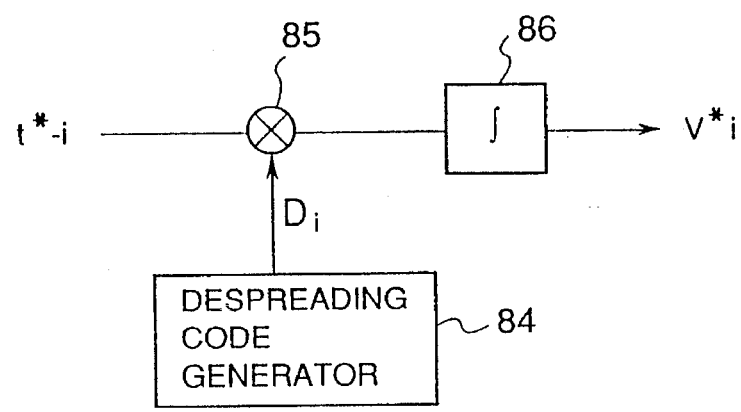
FIG. 16 is a more detailed drawing of one part of the final correlator in FIG. 11.

The final correlator 70 in FIG. 11 comprises M identical parts, one for processing each of the sum signals t*-i. FIG. 16 shows the structure of one of these parts, comprising a despreading code generator 84, a multiplier 85, and an integrator 86. The despreading code generator 84 generates the despreading code $D_i$ of the i-th station, the multiplier 85 multiplies it by the sum signal t*-i, and the integrator 86 integrates the resulting products to produce the final estimated symbol value V*i.

Next the operation of the second embodiment will be described.

First, the operation of the adjustment processor 78 will be described, using the symbols $F_1$ and $F_2$ to denote the outputs of the gain adjustment processor 81 and the symbol adjustment processor 82.

The gain adjustment processor 81 takes the average absolute value F* of the preliminary symbol value $F_{i,j}$ over a certain number of symbols, and divides $F_{i,j}$ by F*, thereby adjusting the preliminary symbol values so as to keep the average absolute value close to unity. That is, it normalizes the preliminary symbol value as follows:

$$F_1 = F_{i,j}/F^*$$

The symbol adjustment processor 82 applies an adjustment function to the normalized value $F_1$. The adjustment function may be a simple linear function such as multiplication by a constant value A:

$$F_2 = A \cdot F_1$$

The limiter 83 then limits the absolute value of $F_2$ so that it does not exceed a certain maximum absolute value MAX, thereby producing the estimated symbol value C-(i, j).

$$C-(i,j) = \begin{vmatrix} \text{MAX} & \text{if} & \text{MAX} \leq F_2 \\ F_2 & \text{if} & -\text{MAX} < F_2 < \text{MAX} \\ -\text{MAX} & \text{if} & F_2 \leq -\text{MAX} \end{vmatrix}$$

The parameters A and MAX can be selected so that they have the effect of moving the preliminary symbol values closer to the true values of plus and minus one. For example, A and MAX can both be a little larger than unity.

Because of the above adjustment, the first residual symbol value $R_{i,j}$ no longer represents the difference between the new estimated symbol value C-(i, j) and the old estimated symbol value C-(i, j-1). The subtractor 80 in the interference estimator 79 must therefore obtain this difference (the second residual symbol value $H_{i,j}$) by direct subtraction:

$$H = C-(i, j) - C-(i, j-1)$$

Using this second residual symbol value $H_{i,j}$, the multiplier 30 and subtractor 32 proceed as in the first embodiment to cancel corresponding estimated interference $E_{i,j}$ from the baseband signal, so that it no longer contains any information that could be obtained from the estimated symbol value C-(i, j).

The baseband signal e-K output by the last interference-canceling stage 67 contains information that has not yet been incorporated into any of the estimated symbol values. This information is now added to all of the estimated symbol values C-(i, K) output from the last stage 71, as follows.

As explained in FIG. 13, the respreader 68 respreads each of thes estimated symbol values C-(i, K) by the corresponding spreading code $PN_i$, and the final adjustment processor 69 adds the remaining baseband signal e-K to each of the respread signals to produce sum signals t*-i to t*-m. It can readily be shown that:

$$\begin{aligned} t^* - i &= e - K + \sum_{k=1}^{K} E_{i,k} \\ &= B - \left[ \sum_{k=1}^{K} \sum_{j=1}^{M} E_{j,k} \right] + \sum_{k=1}^{K} E_{i,k} \\ &= B - \sum_{\substack{k=1 \\ j \neq i}}^{K} \sum_{j=1}^{M} E_{j,k} \end{aligned}$$

That is, t*-i consists of the baseband signal B minus all of the interference $E_{j,k}$ estimated to have been produced by transmitting stations other than the i-th transmitting station.

Next the operation of the final correlator 70 will be described. The integrator 86 in FIG. 16 performs the same type of operation as the accumulator 36 and normalizer 38 in FIG. 5. Since $PN_i \cdot PN_i$ is always equal to unity, the final estimated symbol value V*i is given as follows.

$$V^*i = (1/G) \sum_{n=1}^{G} [e_K(n) \cdot PN_i(n) + C-(i, K) \cdot PN_i(n) \cdot PN_i(n)]$$

$$V^*i = \left[ (1/G) \sum_{n=1}^{G} e_K(n) \cdot PN_i(n) \right] + C-(i, K)$$

If K is sufficiently large, the $e_K(n)$ values will be small, and the first term on the right side of the above equation will amount to a small adjustment of the estimated symbol value C-(i, K), tending to bring it closer to the symbol value actually transmitted by the i-th transmitting station.

Figure 17:
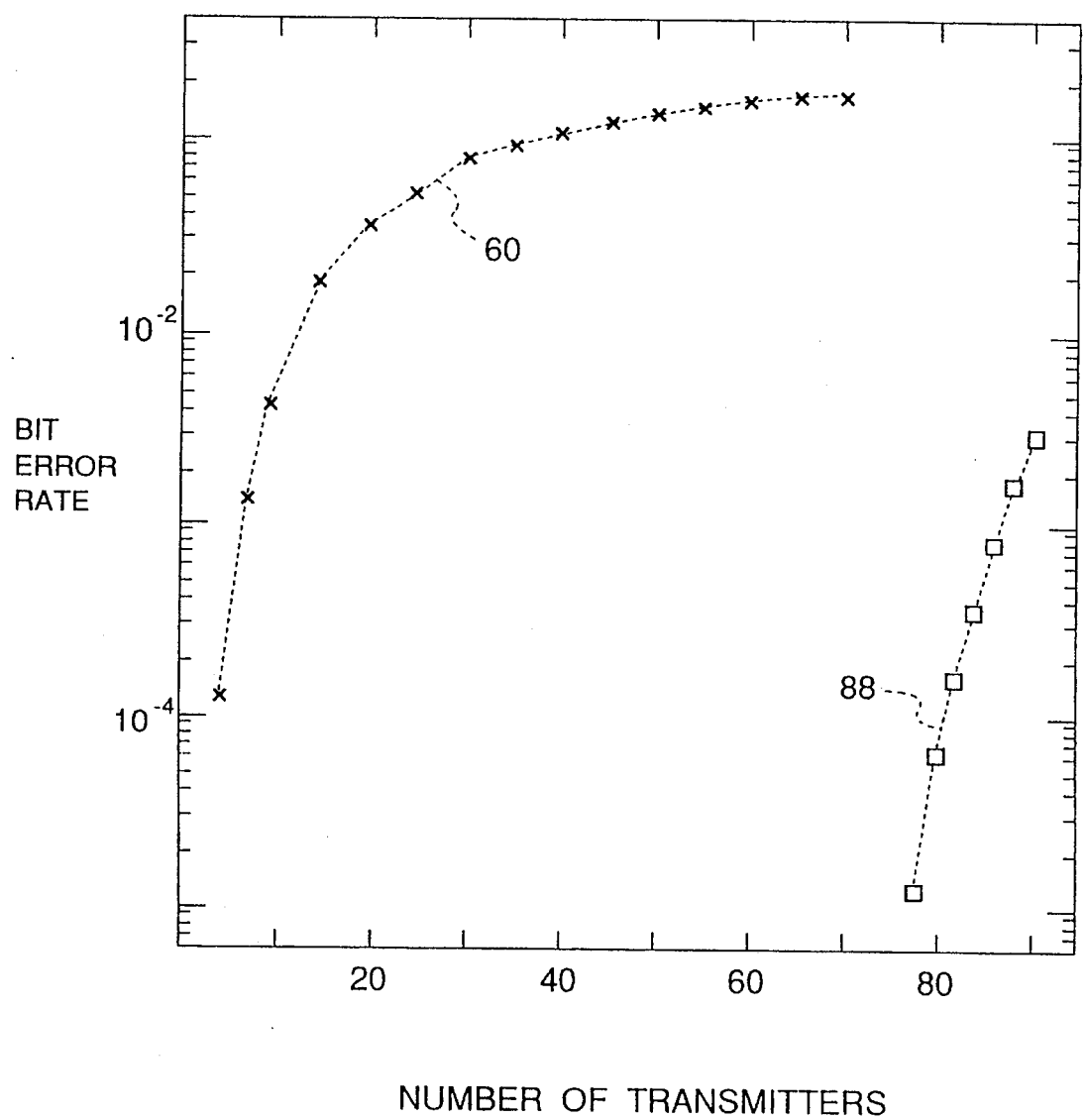
FIG. 17 compares bit-error-rate characteristics of the second embodiment and the prior art.

FIG. 17 shows bit error rates obtained by simulation of the operation of the second embodiment and the prior-art receiver. As in FIG. 10, bit error rate is shown on the vertical axis and the number of transmitting stations (M) on the horizontal axis. Prior-art curve 60 is identical to the curve in FIG. 10. Curve 88, with data points marked by squares, represents the second embodiment of the invention. If an acceptable bit error rate is $10^{-3}$, then the second embodiment permits over eighty stations to communicate simultaneously.

Next, some variants of the preceding embodiments will be described.

One variant of the first embodiment employs the interference cancelers 71-(i, j) of the second embodiment, shown in FIG. 14, in place of the interference cancelers 10-(i, j) of FIG. 4. The adjustment processor 78 can be expected to improve reception performance, even without the final adjustment made by adding e-K to the estimated symbol values.

Another variant of the first embodiment keeps the same interference cancelers 10-(i, j), but adds the respreader 68, final adjustment processor 69, and final correlator 70 of the second embodiment, again leading to improved reception performance.

A variant of the second embodiment inserts a single gain adjustment processor, or automatic-gain-control (AGC) amplifier, between the front-end circuit 2 and baseband processor 64, instead of providing a separate gain adjustment processor 81 in each of the interference cancelers 71-(i, j). Alternatively, in systems in which the input signal power does not vary, the gain adjustment processor 81 can be omitted completely. Even if the input signal power does vary, the gain adjustment processor 81 can be omitted if the value of the MAX parameter in the limiter 83 is varied responsive to the input signal power. Similar variants are of course possible when the interference cancelers 71-(i, j) of the second embodiment are used in the first embodiment.

A variant of either the first or the second embodiment has a single stage of interference cancelers, instead of K stages. Since no estimated symbol values are input from a preceding stage, the adder 28 in FIG. 4, or the adder 28 and subtractor 80 in FIG. 14, may be omitted.

Although FIGS. 1 and 11 showed a front-end circuit 2 with an antenna 1 for receiving radio signals, the invention is not restricted to radio communication. As noted earlier, CDMA can also be employed in optical or acoustic communication, or in electrical communication routed via power lines, in which case the antenna 1 and front-end circuit 2 of the drawings should be replaced by suitable apparatus for receiving the transmitted signal and converting it to an electrical baseband signal.

Figure 18:
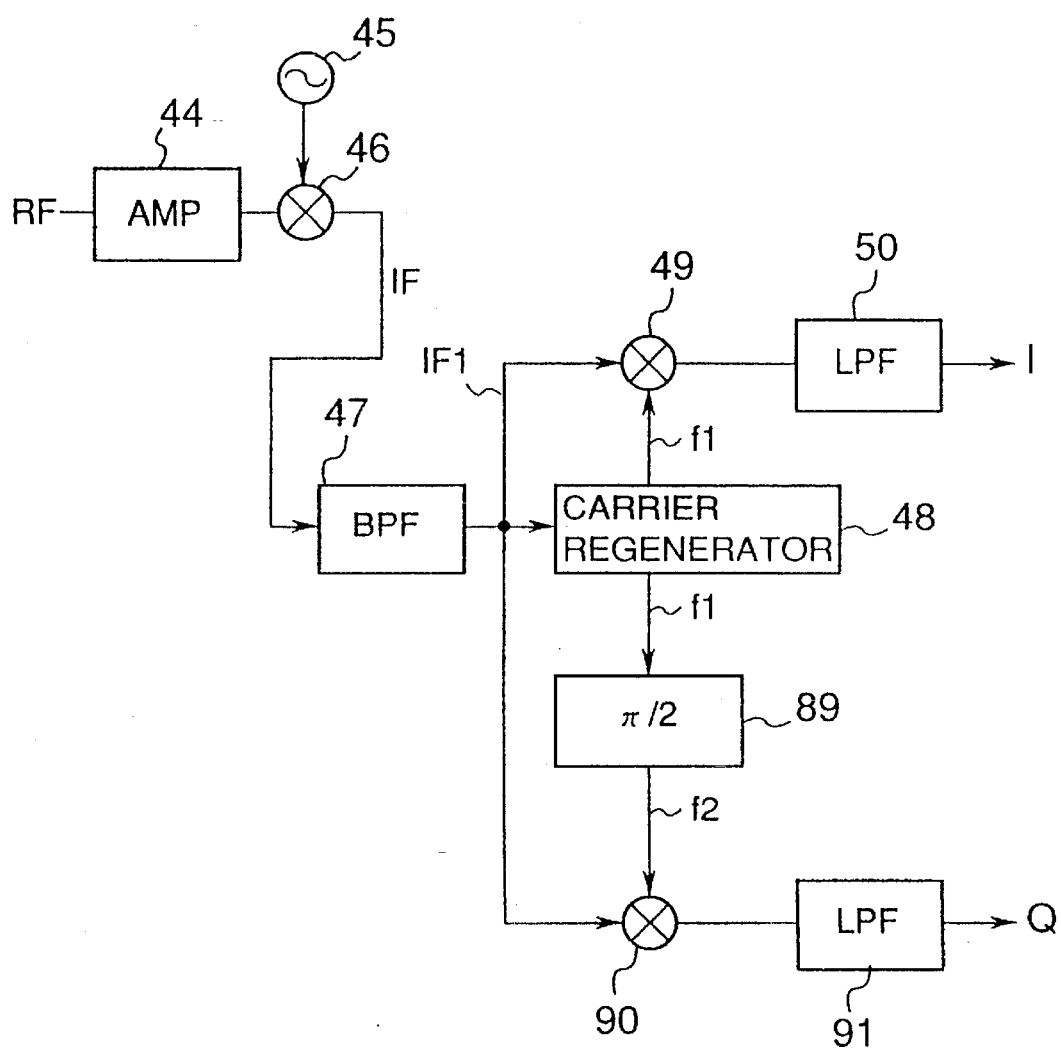
FIG. 18 is a drawing of another front-end circuit.

FIG. 18 shows a front-end circuit 2 for yet another variant, employing quaternary phase-shift keying (QPSK). The amplifier 44, local oscillator 45, synchronous detector 46, BPF 47, carrier regenerator 48, mixer 49, and LPF 50 are as illustrated in FIG. 6. The carrier regenerator 48 generates a first carrier signal f1, which is mixed with the filtered intermediate-frequency signal IF1 in the mixer 49 and filtered by the LPF 50 to produce an in-phase baseband signal I.

In addition, the first carrier signal f1 is provided to a π/2 phase shifter 89, which alters the phase of the first carrier f1 to produce a second carrier signal f2, the two carriers f1 and f2 being in quadrature to one another. A second mixer 90 mixes the filtered intermediate-frequency signal IF1 with this second carrier f2, and a second LPF 91 filters the result to produce a quadrature baseband signal Q.

The QPSK receiver of this variant has two baseband processors 4, or two baseband processors 64, disposed in parallel. The two baseband signals I and Q are supplied to respective baseband processors, and processed separately as described in the first or second embodiment. This produces two sets of estimated symbol values $t_I$-i and $t_Q$-i, or $V_I^*$i and $V_Q^*$i. Both sets of estimated symbol values are input to the decoder 9, which decodes them to produce output data Wi.

A similar receiver configuration, with in-phase and quadrature baseband signals I and Q, can be used when differential binary phase-shift keying (DBPSK) is employed with asynchronous detection. In this case the I and Q estimated symbol values are combined before input to the decoder 9. The combining process will be described in connection with the next variant.

This next variant of the above embodiments provides path diversity by allowing signals from the same transmitting station to arrive over several different paths, with different transmission delays. The receiver treats the signal received via each path as if it came from a separate transmitting station. If there are L paths per transmitting station, for example, the receiver has L·M interference cancelers per interference-canceling stage, one for each path of each transmitting station. With K stages, the receiver has K·L·M interference cancelers in all. In each stage, the L interference cancelers for the same transmitting station employ the same spreading and despreading codes, but with differing synchronization timing.

When path diversity is provided, the estimated symbol values must be combined before they are input to the decoder 9. The combining process is similar to the well-known RAKE process.

Figure 19:
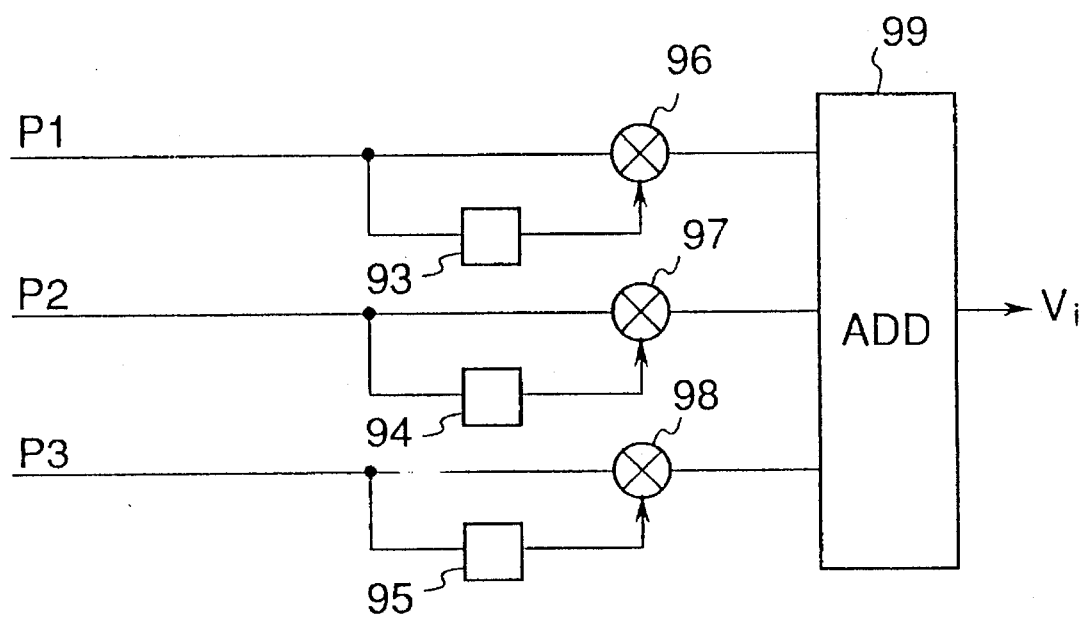
FIG. 19 is a block diagram of a path-combining processor.

FIG. 19 shows a suitable path-combining processor for three-fold path diversity when, for example, DBPSK is employed with asynchronous detection in the front-end circuit 2. P1, P2, and P3 are three pairs of estimated symbol values which originated at the same transmitting station but arrived via different paths. Each pair consists of an in-phase (I) value and a quadrature (Q) value, which can be treated as the real and imaginary parts of a complex number. In the first embodiment, each pair comprises two of the estimated symbol values t-i. In the second embodiment, each pair comprises two of the estimated symbol values V*i.

These pairs of estimated symbol values P1, P2, and P3 are input to respective conjugating circuits 93, 94, and 95. Each conjugating circuit converts the pair of input values, treated as a complex number, to their complex conjugate. Because of the differential encoding of the DBPSK signal, the conjugate value is output with a one-symbol delay. The delayed conjugate values are multiplied by the original values P1, P2, and P3 in respective multipliers 96, 97, and 98, producing product values which are near to plus or minus one, depending on whether the current symbol and the preceding symbol have the same value or different values; that is, depending on the differential symbol value.

When reception of a symbol has been completed on three paths, so that P1, P2, and P3 are all estimates of the same symbol value, the product values obtained by the multipliers 96, 97, and 98 are output to an adder 99, which takes their sum Vi, thereby combining the signals on the three paths. One path-combining processor as shown in FIG. 19 is provided for each transmitting station. The output sums Vi are furnished to the decoder 9 as estimated differential symbol values for the respective stations.

If the relative transmission delay on the different paths is comparable to or greater than the duration of one symbol, compensating delays lines can be provided for P1, P2, and P3 before input to the conjugating circuits 93, 94, and 95 and multipliers 96, 97, and 98, to ensure that all three multipliers can output estimated values for the same symbol simultaneously. The estimated values may also be weighted, according to the signal strengths on the different paths, for example, so that they are combined in the optimum ratio.

Each paired conjugating circuit and multiplier in FIG. 19 form a combining circuit for combining I and Q estimated signal values. These combining circuits may be used in receivers that produce I and Q baseband signals even when there is no path diversity.

In another variant, the data supplied to the transmitting stations are block-encoded, then interleaved to avoid having burst-errors on the transmission path concentrated into a single block. In this case the estimated symbol values provided to the decoder 9 in the receiver must be de-interleaved. A de-interleaver can be disposed between the baseband processor 4 and the decoder 9 in the first embodiment, between the final correlator 70 and the decoder 9 in the second embodiment, or between the path-combining processor shown in FIG. 19 and the decoder 9 if path diversity is provided.

Figure 20:
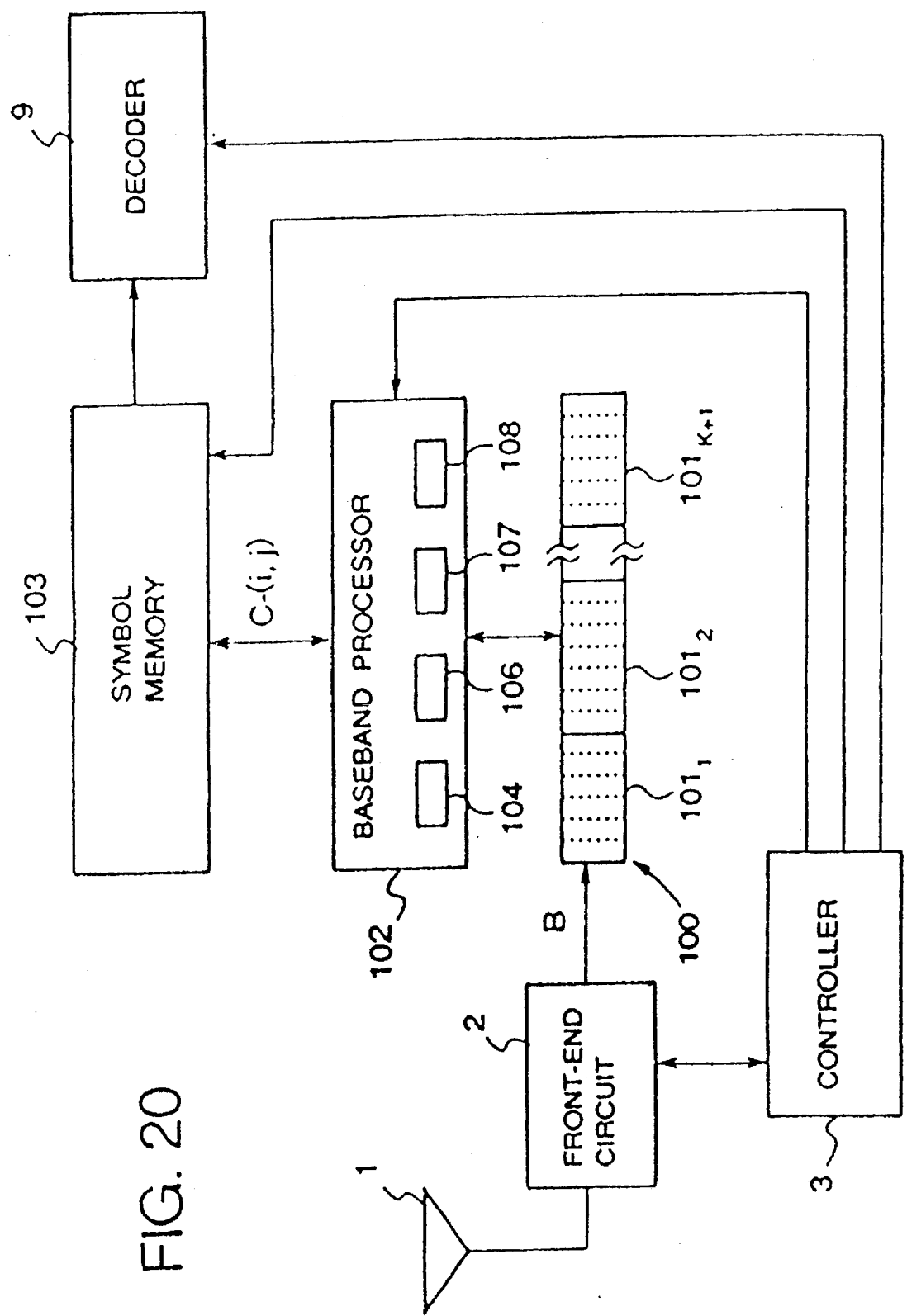
FIG. 20 is a block diagram of a third embodiment of the invented receiver.

FIG. 20 illustrates a third embodiment of the invented receiver. The antenna 1, front-end circuit 2, controller 3, and decoder 9 are as in FIGS. 1 and 11. The baseband signal B from the front-end circuit 2 is fed into a shift register 100 and processed by a baseband processor 102. The baseband processor 102 produces estimated symbol values C-(i, j) as in the first two embodiments, and stores them in a symbol memory 103. Final estimated symbol values are output from the symbol memory 103 to the decoder 9.

The shift register 100 has sufficient length to store baseband signal data for K+1 consecutive symbols, where K is a positive integer corresponding to the number of stages in the first two embodiments. The shift register 100 can be viewed as divided into K+1 stages $101_1, 101_2, \ldots, 101_{K+1}$, each stage holding G chips, where G is the spreading gain. In the drawing, boundaries between stages are indicated by solid lines, and boundaries between chips by dotted lines. As each new chip of baseband data is input from the front-end circuit 2, the contents of the shift register 100 shift one chip to the right in the drawing.

Instead of comprising K·M interference cancelers coupled in series, the baseband processor 102 comprises a single interference canceler 104 having, for example, the configuration shown in FIG. 4 or 14. The code generator in this interference canceler is capable of generating the spreading and despreading codes of all stations, rather than just those of a single station.

The baseband processor also comprises a respreader 106, final adjustment processor 107, and final correlator 108. These are similar to the corresponding elements in FIGS. 11 and 13, except that they need operate on only one symbol stored in the symbol memory 103. They also operate on the baseband signal stored in the (K+1)-th stage $101_{K+1}$ of the shift register 100.

The symbol memory 103 stores (K+1)·M estimated symbol values, comprising (K+1) estimated symbol values C-(i, 1) to C-(i, K+1) for each of M stations. Alternatively, if L-fold path diversity is provided, the symbol memory 103 stores (K+1)·L·M estimated symbol values.

Next the operation of this receiver will be described.

When the controller 3 detects a symbol boundary of the i-th transmitting station, the shift register 100 contains data for K+1 consecutive symbols transmitted by the i-th station, each stage $101_j$ containing chip data for one symbol. At this point the symbol memory 103 contains estimated symbol values C-(i, 2), ..., C-(i, K+1) for all of these symbols except the first, no value having yet been estimated for the first symbol.

The controller 3 directs the interference canceler 104 in the baseband processor 102 to generate the spreading and despreading codes of the i-th station, and read the data from the first stage $101_1$ of the shift register 100. The interference canceler 104 operates as already described, producing an estimated symbol value C-(i, 1), which is stored in the symbol memory 103. An estimated interference signal is also produced and subtracted from the first-symbol portion of the baseband signal stored in the first stage $101_1$ of the shift register 100.

Next, the interference canceler 104 reads the data from the second stage $101_2$ of the shift register 100. An old estimated symbol value C-(i, 2) for these data already exists in the symbol memory 103. The interference canceler 104 reads this old estimated symbol value, and operates as described in the first or second embodiment, producing a new estimated symbol value. The interference canceler 104 writes this new estimated symbol value back to the symbol memory 103, updating the C-(i, 2) value stored there. The interference canceler 104 also modifies the data in the second stage $101_2$ of the shift register 100 by subtracting an estimated interference signal, as described in the first two embodiments.

Continuing in this way, the interference canceler 104 updates estimated symbol values C-(i, 3,), ..., C-(i, K) in the symbol memory, and modifies the corresponding data in stages $101_3$, ..., $101_K$ of the shift register 100.

While the first K symbols are being processed in this way, the respreader 106, final adjustment processor 107, and final correlator 108 adjust the (K+1)-th estimated symbol value C-(i, K+1). The adjustment is carried out as described in the second embodiment: the respreader 106 respreads the estimated symbol value C-(i, K+1), using the spreading code of the i-th station, to produce a respread signal; the final adjustment processor 107 adds the contents of the (K+1)-th stage $101_{K+1}$ of the shift register 100 to produce a sum signal; and the final correlator 108 correlates the sum signal with the despreading code of the i-th station. The resulting final adjusted value of C-(i, K+1) is output to the decoder 9.

This symbol value C-(i, K+1) is then discarded from the symbol memory 103, and the other symbol values estimated for the i-th station are shifted one position to the right, so that C-(i, j) becomes C-(i, j+1), in preparation for processing at the next symbol boundary of the i-th station. This shift corresponds to the sending of estimated symbol values from one interference-canceling stage to the next in the first two embodiments.

All of this professing is completed before the next chip is received from the front-end circuit 2. If symbol boundaries for a plurality of stations occur simultaneously, the controller 3 directs the baseband processor 102 to process them in a fixed order.

There is a notational difference between FIG. 20 and FIGS. 4 and 14. The interference cancelers in the baseband professors in FIGS. 4 and 14 are shown as receiving an old estimated symbol value C-(i, j–1) and producing a new estimated symbol value C-(i, j). The interference canceler 104 in FIG. 20 takes an old estimated symbol value C-(i,j) from the symbol memory 103, uses it to obtain a new estimated symbol value C-(i, j), and writes the new value of C-(i, j) back to the symbol memory 103. This difference is purely notational, however; the operations actually performed are the same.

The third embodiment illustrates the effect of the invention in reducing memory requirements. It is not necessary to maintain a separate copy of the received baseband signal for each station, as it is with conventional parallel architectures. Only the estimated symbol values need be kept separate. The saving of memory space is considerable; with a spreading gain of sixty-four, for example, the symbol values require less than two percent as much memory space as the baseband signal.

As a variant of the third embodiment, the baseband processor 102 may have several interference cancelers 104 instead of just one. With two interference cancelers 104, for example, the baseband processor 102 can process two stages of the shift register 100 at once. With K interference cancelers 104, the first K stages of the shift register 100 can all be processed at once. The interference cancelers 104 operate in parallel and do not communicate with one another. It is still necessary to store only a single copy of the baseband signal in the shift register 100.

As another variant of the third embodiment, the final adjustment may be omitted, in which case the baseband processor 102 does not require a respreader 106, final adjustment processor 107, and final correlator 108. The shift register 100 should then have K stages instead of K+1, and the symbol memory (103) need store only K·M estimated symbol values.

The third embodiment can also be modified to process in-phase (I) and quadrature (Q) baseband signals, or to provide path diversity, as described earlier. To process in-phase and quadrature baseband signals, two shift registers 100 are required.

The embodiments and variants described so far have decoded the symbol data of all transmitting stations. This would be appropriate in a receiver in the base station of, for example, a cellular communication system, which must simultaneously receive signals from a plurality of mobile stations. A receiver in a mobile station, however, need receive only a signal from the base station.

The base station transmits to all mobile stations simultaneously, using different spreading codes to spread the symbols intended for different mobile stations. Each mobile station should estimate the symbol values for all stations, so that it can cancel the corresponding interference, but it is not necessary to decode the symbols intended for other mobile stations. In the receiver in a mobile station, in the first embodiment, the decoder 9 need decode only the estimated symbol values intended for that mobile station. In the second and third embodiments, the respreader 68 or 106, final adjustment processor 69 or 107, and final correlator 70 or 108 need process only those estimated symbol values.

In general, a receiver can be configured to decode an arbitrary subset of the final estimated symbol values.

Those skilled in the art will recognize that further modifications to the embodiments described above can be made without departing from the scope claimed below.

What is claimed is:

1. A method of receiving a code-division multiple-access signal combining symbol values spread by a plurality of spreading codes, comprising the steps of:

(a) converting said code-division multiple-access signal to a baseband signal;

(b) recognizing a boundary of a symbol in said baseband signal;

(c) generating a spreading code by which said symbol was spread, and a corresponding despreading code;

(d) generating a symbol value input of said symbol, by using said baseband signal and said despreading code;

(e) estimating an interference signal, by using said spreading code to spread the symbol value input;

(f) modifying said baseband signal by subtracting said interference signal; and (g) repeating said steps (b) through (f) at least once for each symbol value combined in said code-division multiple-access signal.

2. The method of claim 1, wherein said steps (c) through (f) are repeated in consecutive stages, including at least a first stage and a last stage, with at least one repetition of said steps (c) through (f) per symbol in each stage.

3. The method of claim 2 wherein, in said first stage, the symbol value input generated in said step (d) is an estimated symbol value of said symbol and said step (d) comprises correlating said despreading code with said baseband signal to generate the estimated symbol value.

4. The method of claim 3 wherein, in said first stage, said step (d) comprises limiting said estimated symbol value to no more than a certain maximum absolute value.

5. The method of claim 4 wherein, in said first stage, said step (d) comprises multiplying said estimated symbol value by a constant in addition to limiting said estimated symbol value to no more than a certain maximum absolute value.

6. The method of claim 3 wherein, in said first stage, said step (d) comprises dividing said estimated symbol value by an average absolute value of a certain number of estimated symbol values, to maintain a substantially constant average absolute value over said number of estimated symbol values.

7. The method of claim 3 wherein, in said stages other than said first stage, said step (d) comprises:

correlating said despreading code with said baseband signal to produce a residual symbol value; and adding said residual symbol value to an estimated symbol value produced in a preceding stage.

8. The method of claim 7 wherein, in stages other than said first stage, said symbol value input is said residual symbol value and said step (e) comprises spreading said residual symbol value by said spreading code.

9. The method of claim 3 wherein, in said stages other than said first stage, said step (d) comprises:

correlating said despreading code with said baseband signal to produce a first residual symbol value;

adding said first residual symbol value to an estimated symbol value produced in a preceding stage, thereby producing a preliminary symbol value; and limiting said preliminary symbol value to no more than a certain maximum absolute value, thereby producing said estimated symbol value.

10. The method of claim 9 wherein, in said first stage, said step (d) also comprises multiplying said preliminary symbol value by a constant.

11. The method of claim 9 wherein, in said first stage, said step (d) also comprises dividing said preliminary symbol value by an average absolute value of a certain number of preliminary symbol values, to maintain a constant average absolute value over said number of preliminary symbol values.

12. The method of claim 9 wherein, in said stages other than said first stage, said step (e) comprises subtracting, from said estimated symbol value, said estimated symbol value produced in a preceding stage, thereby producing a second residual symbol value; and spreading said second residual symbol value by said spreading code.

13. The method of claim 2 wherein, in said first stage, said symbol value input is an estimated symbol value of said symbol and said step (e) comprises spreading said estimated symbol value by said spreading code.

14. The method of claim 2, wherein the symbol value input generated in said step (d) is an estimated symbol value of said symbol, the method comprising the further steps of:

(h) respreading, in said last stage, the estimated symbol value, thereby producing a respread signal;

(i) adding said baseband signal to said respread signal, thereby producing a sum signal; and (j) correlating said sum signal with a despreading code.

15. The method of claim 14, wherein, in said last stage, said steps (h), (i), and (j) are carried out for all estimated symbol values generated in said step (d) in all previous stages.

16. The method of claim 2, wherein the symbol value input generated in said step (d) is an estimated symbol value of said symbol, and wherein said steps (b) through (f) are carried out multiple times for a single symbol in each of said stages from said first stage to said last stage, to provide path diversity, and estimated symbol values generated in said last stage for said symbol are combined.

17. The method of claim 1, wherein the symbol value input generated in said step (d) is an estimated symbol value of said symbol, and wherein said step (a) produces two baseband signals, and said steps (b) through (g) are carried out separately for both of said baseband signals, with pairs of resulting estimated symbol values being combined after all repetitions of said steps (c) through (f).

18. The method of claim 1, wherein the symbol value input is an estimated symbol value of the symbol.

19. A code-division multiple-access receiver for receiving a code-division multiple-access signal combining signals of a plurality of stations, each station having a different spreading code and a corresponding despreading code, comprising:

a front-end circuit for converting said code-division multiple-access signal to a baseband signal;

a controller coupled to said front-end circuit, for recognizing symbol boundaries in said baseband signal; and a baseband processor coupled to said front-end circuit, for receiving said baseband signal, storing successive one-symbol portions of said baseband signal, despreading said one-symbol portions of said baseband signal to generate estimated symbol values, respreading said estimated symbol values to generate estimated interference signals, and modifying said baseband signal by subtracting said estimated interference signals, these processes of despreading, respreading, and modifying being carried out in a cyclic order responsive to symbol boundaries recognized by said controller.

20. The receiver of claim 19, wherein said baseband processor comprises a first interference-canceling stage having a plurality of interference cancelers for generating estimated symbol values of respective stations, including at least one interference canceler for each of said stations.

21. The receiver of claim 20, wherein said first interference-canceling stage comprises more than one interference canceler per station, thereby providing path diversity by estimating separate values for a symbol that arrives via different paths with different delays.

22. The receiver of claim 20, wherein each interference canceler in said first interference-canceling stage separately comprises:

a code generator for generating a spreading code and a despreading code of one of said stations;

a correlator for correlating said despreading code with a one-symbol portion of said baseband signal, thereby generating an estimated symbol value;

a multiplier for respreading said estimated symbol value, using said spreading code, thereby generating an estimated interference signal; and a subtractor for subtracting said estimated interference signal from said one-symbol portion of said baseband signal.

23. The receiver of claim 22, wherein each interference canceler in said first interference-canceling stage also comprises an adjustment processor for adjusting said estimated symbol value.

24. The receiver of claim 23, wherein said adjustment processor comprises a gain adjustment processor for dividing said estimated symbol value by an average absolute value of a certain number of estimated symbol values generated by said correlator.

25. The receiver of claim 23, wherein said data adjustment processor comprises a symbol adjustment processor for multiplying said estimated symbol value by a constant value.

26. The receiver of claim 23, wherein said data adjustment processor comprises a limiter for limiting said estimated symbol value to a certain maximum absolute value.

27. The receiver of claim 20, wherein:

said baseband processor comprises a plurality of interference-canceling stages, including at least said first interference-canceling stage and a last interference-canceling stage, coupled in series;

said baseband signal is passed through said series from said first interference-canceling stage toward said last interference-canceling stage;

each interference-canceling stage other than said first interference-canceling stage comprises a plurality of interference cancelers for generating estimated symbol values of respective stations, including at least one interference canceler for each of said stations; and each interference-canceling stage other than said first interference-canceling stage receives, as old estimated symbol values, the estimated symbol values generated in a preceding interference-canceling stage in said series.

28. The receiver of claim 27, wherein each interference-canceling stage other than said first interference-canceling stage comprises more than one interference canceler per station, thereby providing path diversity by estimating separate values for a symbol that arrives via different paths with different delays.

29. The receiver of claim 27, wherein each interference canceler in interference-canceling stages other than said first interference-canceling stage separately comprises:

a code generator for generating a spreading code and a despreading code of one of said stations;

a correlator for correlating said despreading code with a one-symbol portion of said baseband signal, thereby producing a residual symbol value;

an adder for adding said residual symbol value to an old estimated symbol value received from a preceding interference-canceling stage, thereby producing the estimated symbol value generated by said interference canceler;

a multiplier for respreading said residual symbol value, using said spreading code, thereby generating an estimated interference signal; and a subtractor for subtracting said estimated interference signal from said one-symbol portion of said baseband signal.

30. The receiver of claim 27, wherein each interference canceler in interference-canceling stages other than said first interference-canceling stage separately comprises:

a code generator for generating a spreading code and a despreading code of one of said stations;

a correlator for correlating said despreading code with a one-symbol portion of said baseband signal, thereby producing a first residual symbol value;

a first adder for adding said first residual symbol value to an old estimated symbol value received from a preceding interference-canceling stage, thereby producing a preliminary symbol value;

an adjustment processor for adjusting said preliminary symbol value, thereby producing the estimated symbol value generated by said interference canceler;

a first subtractor for subtracting from said estimated symbol value the old estimated symbol value received from said preceding interference-canceling stage, thereby producing a second residual symbol value;

a multiplier for respreading said second residual symbol value, using the spreading code output by said code generator, thereby generating an estimated interference signal; and a second subtractor for subtracting said estimated interference signal from said baseband signal.

31. The receiver of claim 30, wherein said adjustment processor comprises a gain adjustment processor for dividing said preliminary symbol value by an average absolute value of a certain number of preliminary symbol values generated by said first adder.

32. The receiver of claim 30, wherein said data adjustment processor comprises a symbol adjustment processor for multiplying said preliminary symbol value by a constant value.

33. The receiver of claim 30, wherein said data adjustment processor comprises a limiter for limiting said preliminary symbol value to a certain maximum absolute value.

34. The receiver of claim 27, comprising:

a respreader for respreading the estimated symbol value generated by at least one of the interference cancelers in said last stage by a corresponding spreading code, thereby generating at least one respread signal;

a final adjustment processor for adding a one-symbol portion of said baseband signal, after modification by said last interference-canceling stage, to said respread signal, thereby generating a sum signal;

a final correlator for correlating said sum signal with a corresponding despreading code, thereby generating a final estimated symbol value; and a decoder for decoding said final estimated symbol value.

35. The receiver of claim 34, wherein said respreader, said final adjustment processor, said final correlator and said decoder operate as described in claim 35 on all estimated symbol values generated in said last interference-canceling stage.

36. The receiver of claim 27, comprising a decoder coupled to said last interference-canceling stage, for decoding at least one of the estimated symbol values generated by said last interference-canceling stage, thus determining data transmitted by at least one of said stations.

37. The receiver of claim 36, wherein said decoder decodes all of the estimated symbol values generated in said last interference-canceling stage.

38. The receiver of claim 20, wherein said baseband processor has no interference-canceling stages other than said first interference-canceling stage, further comprising:
   a respreader for respreading the estimated symbol value generated by at least one of the interference cancelers in said first interference-canceling stage by a corresponding spreading code, thereby generating at least one respread signal;
   a final adjustment processor for adding a one-symbol portion of said baseband signal, after modification by said first interference-canceling stage, to said respread signal, thereby generating a sum signal;
   a final correlator for correlating said sum signal with a corresponding despreading code, thereby generating a final estimated symbol value; and
   a decoder for decoding said final estimated symbol value.

39. The receiver of claim 38, wherein said respreader, said final adjustment processor, said final correlator, and said decoder operate as described in claim 33 on all estimated symbol values generated in said first interference-canceling stage.

40. The receiver of claim 19, comprising a decoder for decoding at least one of the estimated symbol values generated by said baseband processor to determine data transmitted by at least one of said stations.

41. The receiver of claim 40, wherein said decoder comprises a Viterbi decoder.

42. The receiver of claim 19, comprising a pair of baseband processors as described in claim 18, wherein said front-end circuit generates a pair of baseband signals, which are provided to respective baseband processors and processed as described in claim 18.

43. The receiver of claim 42, comprising a combining circuit for combining pairs of estimated symbol values output by respective baseband processors.

44. The receiver of claim 19, wherein:
   said baseband processor obtains different estimated symbol values for a single symbol transmitted from a single station over different paths; and
   said baseband processor comprises a path-combining processor for combining said different estimated symbol values.

45. The receiver of claim 19, wherein said front-end circuit receives a radio-frequency code-division multiple-access signal from an antenna and converts it to said baseband signal.

46. The receiver of claim 19, wherein said front-end circuit receives a radio-frequency code-division multiple-access signal from a power line and converts it to said baseband signal.

47. The receiver of claim 19, wherein said front-end circuit receives an optical code-division multiple-access signal and converts it to an electrical baseband signal.

48. The receiver of claim 19, wherein said front-end circuit receives an acoustic code-division multiple-access signal and converts it to an electrical baseband signal.

49. A code-division multiple-access receiver for receiving a code-division multiple-access signal combining signals of a plurality of stations, each station having a different spreading code and a corresponding despreading code, comprising:
   a front-end circuit for converting said code-division multiple-access signal to a baseband signal;
   a shift register coupled to said front-end circuit, for receiving, storing, and shifting said baseband signal;
   a controller coupled to said front-end circuit, for recognizing symbol boundaries in said baseband signal;
   a symbol memory for storing estimated symbol values; and
   a baseband processor coupled to said shift register and said symbol memory, for reading from said shift register a part of said baseband signal corresponding to one symbol, generating a spreading code by which said symbol was spread, generating a corresponding despreading code, using said part of said baseband signal and said despreading code to generate an estimated symbol value storing said estimated symbol value in said symbol memory, using said spreading code to generate an estimated interference signal, and modifying said part of said baseband signal in said shift register by subtracting said estimated interference signal.

50. The receiver of claim 49, wherein said baseband processor comprises an interference canceler having:
   a code generator for generating said spreading code and said corresponding despreading code;
   a correlator for correlating said despreading code with said part of said baseband signal, thereby producing a residual symbol value;
   an adder for adding said residual symbol value to an old estimated symbol value stored in said symbol memory, thereby generating the estimated symbol value referred to in claim 48, which is stored in said symbol memory in place of said old estimated symbol value:
   a multiplier for respreading said residual symbol value, using the spreading code output by said code generator, thereby generating said estimated interference signal; and
   a subtractor for subtracting said estimated interference signal from said part of said baseband signal.

51. The receiver of claim 49, wherein said baseband processor comprises an interference canceler having:
   a code generator for generating said spreading code and said corresponding despreading code;
   a correlator for correlating said despreading code with said part of said baseband signal, thereby producing a first residual symbol value;
   a first adder for adding said first residual symbol value to an old estimated symbol value stored in said symbol memory, thereby producing a preliminary symbol value;
   an adjustment processor for adjusting said preliminary symbol value to produce a new estimated symbol value;
   a first subtractor for subtracting said old estimated symbol value from said new estimated symbol value, thereby producing a second residual symbol value;
   a multiplier for respreading said second residual symbol value, using the spreading code output by said code generator, thereby generating said estimated interference signal; and
   a second subtractor for subtracting said estimated interference signal from said part of said baseband signal; said new estimated symbol value being stored in said symbol memory In place of said old estimated symbol value.

52. The receiver of claim 51, wherein said adjustment processor comprises a gain adjustment processor for dividing said preliminary symbol value by an average absolute value of a certain number of preliminary symbol values produced by said first adder.

53. The receiver of claim 51, wherein said data adjustment processor comprises a symbol adjustment processor for multiplying said preliminary symbol value by a constant value.

54. The receiver of claim 51, wherein said data adjustment processor comprises a limiter for limiting said new estimated symbol value to a certain maximum absolute value.

55. The receiver of claim 49, wherein said baseband processor also comprises:

a respreader for respreading an estimated symbol value stored in said symbol memory, using a spreading code of a corresponding station, thereby producing a respread signal;

a final adjustment processor for adding a final part of the baseband signal stored in said shift register to said respread signal, thereby producing a sum signal; and a final correlator for correlating said sum signal with the despreading code of said corresponding station, thereby generating an adjusted value of the estimated symbol value respread by said respreader.

56. The receiver of claim 49, wherein:

said shift register is divided into stages, each stage holding a part of said baseband signal corresponding to one symbol.

57. The receiver of claim 56, wherein said symbol memory stores one estimated symbol value per station for each of said stages.

58. The receiver of claim 56, wherein said symbol memory stores more than one estimated symbol value per station for each of said stages, thereby providing path diversity.

59. The receiver of claim 56, comprising a decoder for decoding estimated symbol values stored in said symbol memory which correspond to the baseband signal stored in a last stage of said shift register.

60. The receiver of claim 49, wherein said despreading codes are identical to said spreading codes.

* * * * *